US012433956B2

(12) United States Patent
Gonzalez Carter et al.

(10) Patent No.: US 12,433,956 B2
(45) Date of Patent: Oct. 7, 2025

(54) METHOD OF ADMINISTERING A NANOPARTICLE

(71) Applicant: KAWASAKI INSTITUTE OF INDUSTRIAL PROMOTION, Kawasaki (JP)

(72) Inventors: Daniel Gonzalez Carter, Kanagawa (JP); Kazunori Kataoka, Kanagawa (JP)

(73) Assignee: KAWASAKI INSTITUTE OF INDUSTRIAL PROMOTION, Kawasaki (JP)

(*) Notice: Subject to any disclaimer, the term of this patent is extended or adjusted under 35 U.S.C. 154(b) by 416 days.

(21) Appl. No.: 17/907,029

(22) PCT Filed: Mar. 19, 2021

(86) PCT No.: PCT/JP2021/011290
§ 371 (c)(1),
(2) Date: Sep. 22, 2022

(87) PCT Pub. No.: WO2021/193393
PCT Pub. Date: Sep. 30, 2021

(65) Prior Publication Data
US 2023/0145172 A1 May 11, 2023

(30) Foreign Application Priority Data
Mar. 26, 2020 (JP) .................... 2020-055478

(51) Int. Cl.
A61K 47/69 (2017.01)
A61K 47/68 (2017.01)
(52) U.S. Cl.
CPC ...... A61K 47/6907 (2017.08); A61K 47/6849 (2017.08); A61K 47/6898 (2017.08)
(58) Field of Classification Search
CPC ............ A61K 47/6907; A61K 47/6898; A61K 47/6849
See application file for complete search history.

(56) References Cited

U.S. PATENT DOCUMENTS

2018/0185281 A1 7/2018 Kataoka et al.
2018/0185501 A1* 7/2018 Kataoka .................. C07K 16/00

OTHER PUBLICATIONS

International Search Report issued Jun. 23, 2021 in PCT/JP2021/011290, 7 pages.
Abbott et al., "Structure and function of the blood-brain barrier", Neurobiology of Disease, vol. 37, Aug. 5, 2009, pp. 13-25.
Altannavch et al., "Effect of High Glucose Concentrations on Expression of ELAM-1, VCAM-1 and ICAM-1 in HUVEC with and without Cytokine Activation", Physiological Research, Institute of Physiology, vol. 53, 2004, pp. 77-82
Andreone et al., "Blood-brain barrier permeability is regulated by lipid transport-dependent suppression of caveolae-mediated transcytosis", Neuron, vol. 94, No. 3, May 3, 2017, pp. 1-31.
Anraku et al., "Glycaemic control boosts glycosylated nanocarrier crossing the BBB into the brain", Nature Communications, vol. 8, No. 1001, Oct. 17, 2017, pp. 1-9.
Azcutia et al., "Inflammation Determines the Pro-Adhesive Properties of High Extracellular D-Glucose in Human Endothelial Cells In Vitro and Rat Microvessels In Vivo", PLoS ONE, vol. 5, Issue 4, e10091, Apr. 8, 2010, pp. 1-12.
Bakhshi et al., "Nitrosation-dependent caveolin 1 phosphorylation, ubiquitination, and degradation and its association with idiopathic pulmonary arterial hypertension", Pulmonary Circulation, vol. 3, No. 4, Dec. 2013, pp. 816-830.
Ben-Zvi et al., "MSFD2A is critical for the formation and function of the blood brain barrier", Nature, vol. 509, No. 7501, May 22, 2014, pp. 1-20.
Brewer et al., "Evidence for Possible Nonspecific Reactions between N-Ethyimaleimide and Proteins", Analytical Biochemistry, vol. 18, 1967, pp. 248-255.
Chen et al., "Unique molecular signatures of disease brain endothelia provide a novel site for CNS-directed enzyme therapy", Nat Med., vol. 15, No. 10, Oct. 2009, pp. 1-20.
Clark et al., "Increased brain uptake of targeted nanoparticles by adding an acid-cleavable linkage between transferrin and the nanoparticle core", PNAS, vol. 112, No. 40, 2015, pp. 12486-12491, XP055340526.
Dan et al., "Binding, Transcytosis and Biodistribution of Anti-PECAM-1 Iron Oxide Nanoparticles for Brain-Targeted Delivery", PLoS One, vol. 8, Issue 11, e81051, Nov. 20, 2013, pp. 1-8, XP055811109.
Deane et al., "RAGE mediates amyloid-β peptide transport across the blood-brain barrier and accumulation in brain", Nature Medicine, vol. 9, No. 7, Jul. 2003, pp. 907-913.
Eppihimer et al., "Differential Expression of Platelet-Endothelial Cell Adhesion Molecule-1 (PECAM-1) in Murine Tissues", Microcirculation, vol. 5, 1998, pp. 179-188.
Farrell et al., "GLUT-1 glucose transporter is present within apical and basolateral membranes of brain epithelial interfaces and in microvascular endothelia with and without tight junctions", The Journal of Histochemistry and Cytochemistry, vol. 40, No. 2, 1992, pp. 193-199 (9 total pages).
Fraga et al., "Expression of LAT1 and LAT2 amino acid transporters in human and rat intestinal epithelial cells", Amino Acids, vol. 29, Jul. 20, 2005, pp. 229-233.
Goldberger et al., "Biosynthesis and Processing of the Cell Adhesion Molecule PECAM-1 Includes Production of a Soluble Form", The Journal of Biological Chemistry, vol. 269, No. 25, Issue of Jun. 24, 1994, pp. 17183-17191.

(Continued)

*Primary Examiner* — Michael P Cohen
(74) *Attorney, Agent, or Firm* — Oblon, McClelland, Maier & Neustadt, L.L.P.

(57) ABSTRACT

A method of administering a nanoparticle to a subject including: administering to the subject an effective amount of an antibody that binds to an antigen expressed on a surface of a brain endothelial cell such that a sufficient amount of the antibody can bind to the surface of the brain endothelial cell, where the antibody is conjugated to a $1^{st}$ molecule. Then administering to the subject a nanoparticle that is coated with a $2^{nd}$ molecule that binds to the $1^{st}$ molecule under a physiological condition in a brain blood vessel such that the nanoparticle can bind to the $1^{st}$ molecule that has attached to the surface of the brain endothelial cell.

9 Claims, 13 Drawing Sheets

(56) References Cited

OTHER PUBLICATIONS

Gonzalez-Carter et al., "L-DOPA Functionalized, Multi-Branched Gold Nanoparticles as Brain-targeted Nano-Vehicles", Nanomedicine: Nanotechnology, Biology and Medicine, vol. 15, No. 1, 2018, pp. 1-27 (28 total pages).

Goulatis et al., "Protein Engineering Approaches for Regulating Blood-Brain Barrier Transcytosis", Current Opinion Structure Biology, vol. 45, 2016, 22 pages.

Hawkins et al., "The Blood-Brain Barrier/Neurovascular Unit in Health and Disease", Pharmacological Reviews, vol. 57, No. 2, 2005, pp. 173-185.

Johnsen et al., "Targeting transferrin receptors at the blood-brain barrier improves the uptake of immunoliposomes and subsequent cargo transport into the brain parenchyma", Scientific Reports, vol. 7, No. 1, Sep. 4, 2017, pp. 1-13, XP055810911, Retrieved from the Internet: URL:https://www.nature.com/articles/s41598-017-11220-1.pdf>.

Kim et al., "The Role of Iron Metabolism in Lung Inflammation and Injury", J Allergy Ther., vol. 3 (Suppl. 4), 2012, pp. 1-14.

Kronstein et al., "Caveolin-1 opens endothelial cell junctions by targeting catenins", Cardiovascular Research, vol. 93, 2012, pp. 130-140.

Kuwahara et al., "Efficient In Vivo Delivery of siRNA Into Brain Capillary Endothelial Cells Along with Endogenous Lipoprotein", Molecular Therapy, vol. 19, No. 12, 2011, pp. 2213-2221.

Lam et al., "Enhanced efficacy of combined temozolomide and bromodomain inhibitor therapy for gliomas using targeted nanoparticles", Nature Communications, vol. 9, May 18, 2018, pp. 1-11.

Li et al., "Choline-Derivate-Modified Nanoparticles for Brain-Targeting Gene Delivery", Advanced Materials, vol. 23, Sep. 5, 2011, pp. 4516-4520.

Li et al., "Choline transporter-targeting and co-delivery system for glioma therapy", Biomaterials, vol. 34, Aug. 28, 2013, pp. 9142-9148.

Li et al., "Large amino acid transporter 1 mediated glutamate modified docetaxel-loaded liposomes for glioma targeting", Colloids and Surfaces B: Biointerfaces, vol. 141, Jan. 23, 2016, pp. 260-267.

Lin et al., "A Role for Low Density Lipoprotein Receptor-related Protein 1 in the Cellular Uptake of Tissue Plasminogen Activator in the Lungs", Pharm Res., vol. 33, No. 1, Jan. 2016, pp. 1-20.

Liu et al., "Local Clustering of Transferrin Receptors Promotes Clathrin-Coated Pit Initiation" Journal of Cell Biology, vol. 191, No. 7, 2010, pp. 1381-1393.

Lutton et al., "Endothelial Targeted Strategies to Combat Oxidative Stress: Improving Outcomes in Traumatic Brain Injury", Frontiers in Neurology, vol. 10, Article 582, Jun. 2019, pp. 1-9.

Mamdouh et al., "Targeted recycling of PECAM from endothelial surface-connected compartments during diapedesis", Nature, vol. 421, Feb. 13, 2003, pp. 748-753.

Muro et al., "A novel endocytic pathway induced by clustering endothelial ICAM-1 or PECAM-1", Journal of Cell Science, vol. 116, No. 8, 2003, pp. 1599-1609.

Noel et al., "PECAM-1 and caveolae form the mechanosensing complex necessary for NOX2 activation and angiogenic signaling with stopped flow in pulmonary endothelium", Am J Physiol Lung Cell Mol Physiol, vol. 305, Sep. 27, 2013, pages L805-L818.

Nutt et al., "Randomized, double-blind trial of glial cell line-derived neurotrophic factor (GDNF) in PD", Neurology, vol. 60, Jan. 2003, pp. 69-73.

Palmer, "The Role of the Blood Brain Barrier in Neurodegenerative Disorders and their Treatment", Journal of Alzheimer's Disease, vol. 24, 2011, pp. 643-658.

Parhiz et al., "PECAM-1 directed re-targeting of exogenous mRNA providing two orders of magnitude enhancement of vascular delivery and expression in lungs independent of apolipoprotein E-mediated uptake", Journal of Controlled Release, vol. 291, Oct. 15, 2018, pp. 106-115.

Sevigny et al., "The antibody aducanumab reduces Aβ plaques in Alzheimer's disease", Nature, vol. 537, Sep. 2016, pp. 50-56 and 564 (21 total pages).

Tang et al., "A ligand motif enables differential vascular targeting of endothelial junctions between brain and retina", PNAS, vol. 116, No. 6, Feb. 5, 2019, pp. 2300-2305.

Tian et al., "LRP-1-mediated intracellular antibody delivery to the Central Nervous System", Scientific Reports, vol. 5, No. 11990, Jul. 20, 2015, pp. 1-14.

Vanlandewijck et al., "A molecular atlas of cell types and zonation in the brain vasculature", Nature, vol. 554, Feb. 22, 2018, pp. 475-480 (total 35 pages).

Wautier et al., "Advanced glycation end products (AGEs) on the surface of diabetic erythrocytes bind to the vessel wall via a specific receptor inducing oxidant stress in the vasculature: A link between surface-associated AGEs and diabetic complications", Proc. Natl. Acad. Sci. USA, vol. 91, Aug. 1994, pp. 7742-7746.

Wiley et al., "Transcytosis and brain uptake of transferrin-containing nanoparticles by tuning avidity to transferrin receptor", PNAS, vol. 110, No. 21, May 21, 2013, pp. 8662-8667.

You et al., "Targeted Brain Delivery of Rabies Virus Glycoprotein 29-Modified Deferoxamine-Loaded Nanoparticles Reverses Functional Deficits in Parkinsonian Mice", ACS Nano, vol. 12, Apr. 4, 2018, pp. 4123-4139.

Yu et al., "Targeting brain microvascular endothelial cells: a therapeutic approach to neuroprotection against stroke", Neural Regeneration Research, vol. 10, Issue 11, Nov. 2015, pp. 1882-1891.

Zhao et al., "Nanoscale manipulation of membrane curvature for probing endocytosis in live cells", Nat Nanotechnol., vol. 12, No. 8, Aug. 2017, pp. 1-21.

Gao et al., "An experimental study on ferromagnetic nickel nanowires functionalized with antibodies for cell separation", Nanotechnology, vol. 21, No. 10, 2010, pp. 1-8, XP020174622.

Garnacho et al., "Differential intra-endothelial delivery of polymer nanocarriers targeted to distinct PECAM-1 epitopes", Journal of Controlled Release, vol. 130, No. 3, 2008, pp. 226-233, XP025404825.

Wiewrodt et al., "Size-dependent intracellular immunotargeting of therapeutic cargoes into endothelial cells", Blood, vol. 99, No. 3, Feb. 1, 2002, pp. 912-922, XP055811707.

Zhang et al., "Creation and Evaluation of a Single-Chain Antibody Tetramer that Targets Brain Endothelial Cells", AIChE Journal, vol. 60, No. 4, Apr. 2014, pp. 1245-1252, XP055363874.

Paganelli et al., "Antibody-guided three-step therapy for high grade glioma with yttrium-90 biotin", European Journal of Nuclear Medicine, vol. 26, No. 4, Apr. 1999, pp. 348-357, XP008019281.

Gonzalez-Carter et al., "Targeting nanoparticles to the brain by exploiting the blood-brain barrier impermeability to selectively label the brain endothelium", PNAS, vol. 117, No. 32, Aug. 11, 2020, pp. 19141-19150, XP055810914, Retrieved from the Internet: URL:https://www.pnas.org/content/pnas/117/32/19141.full.pdf>.

* cited by examiner

[Fig. 1]
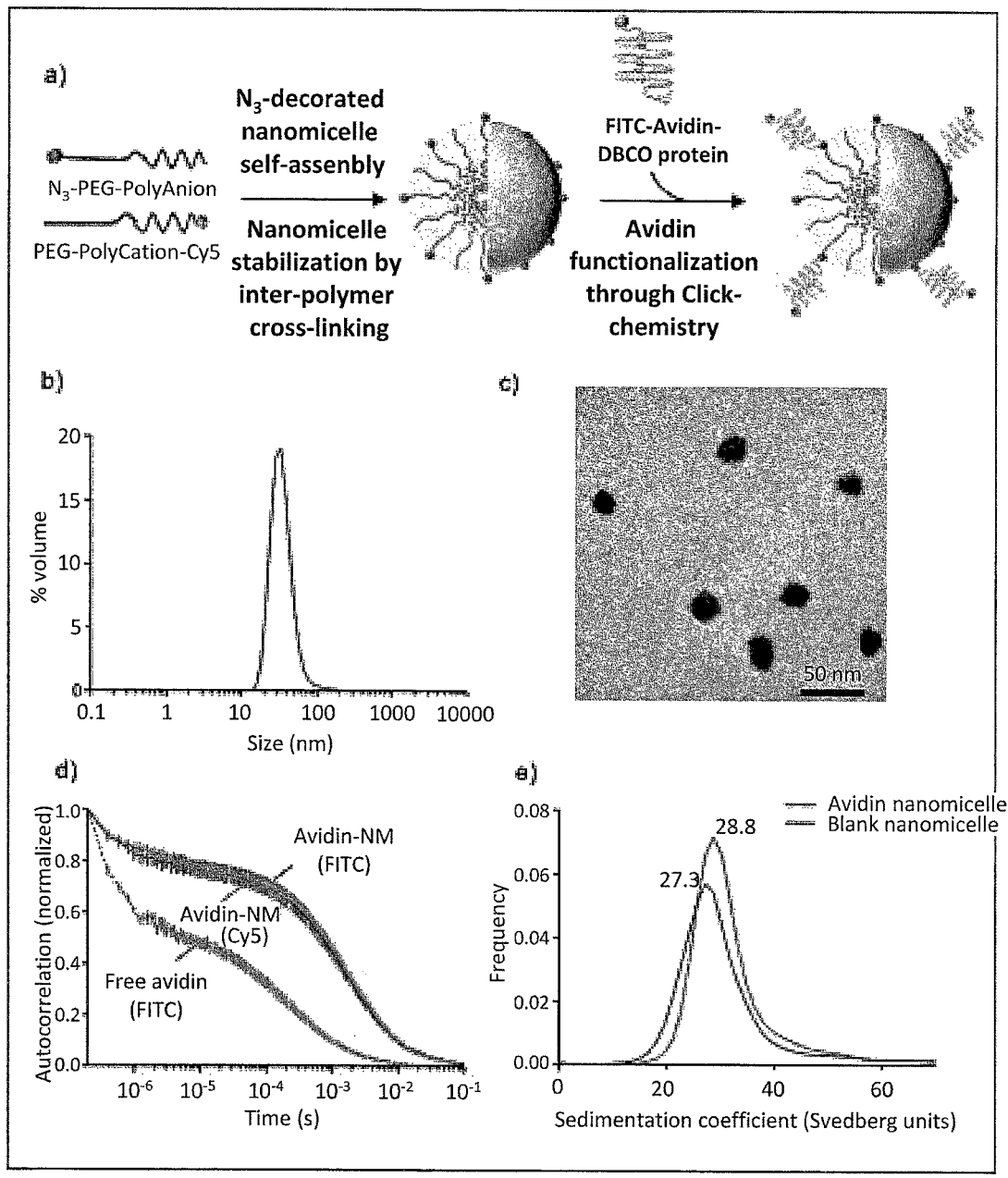

[Fig. 2]
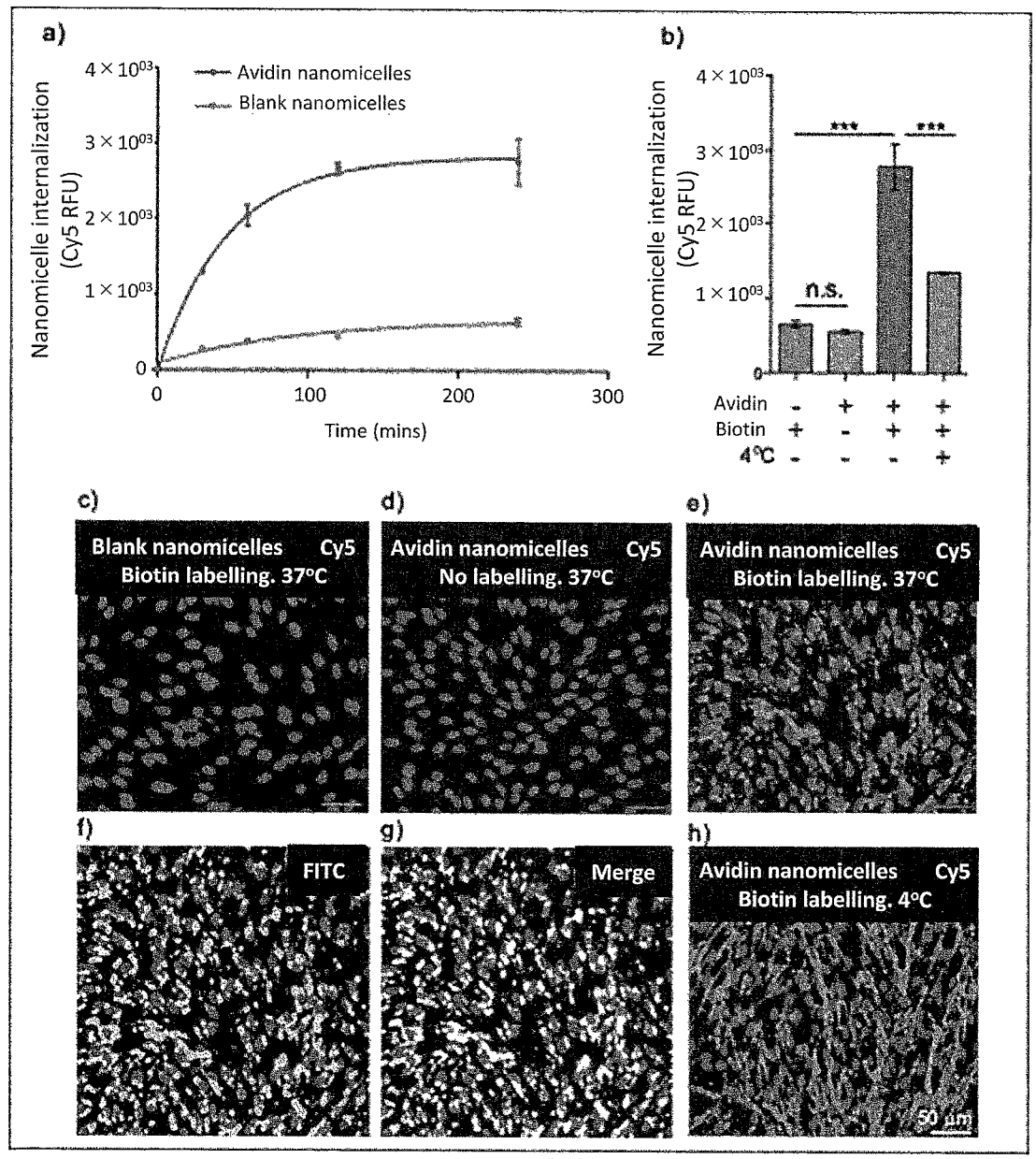

[Fig. 3]
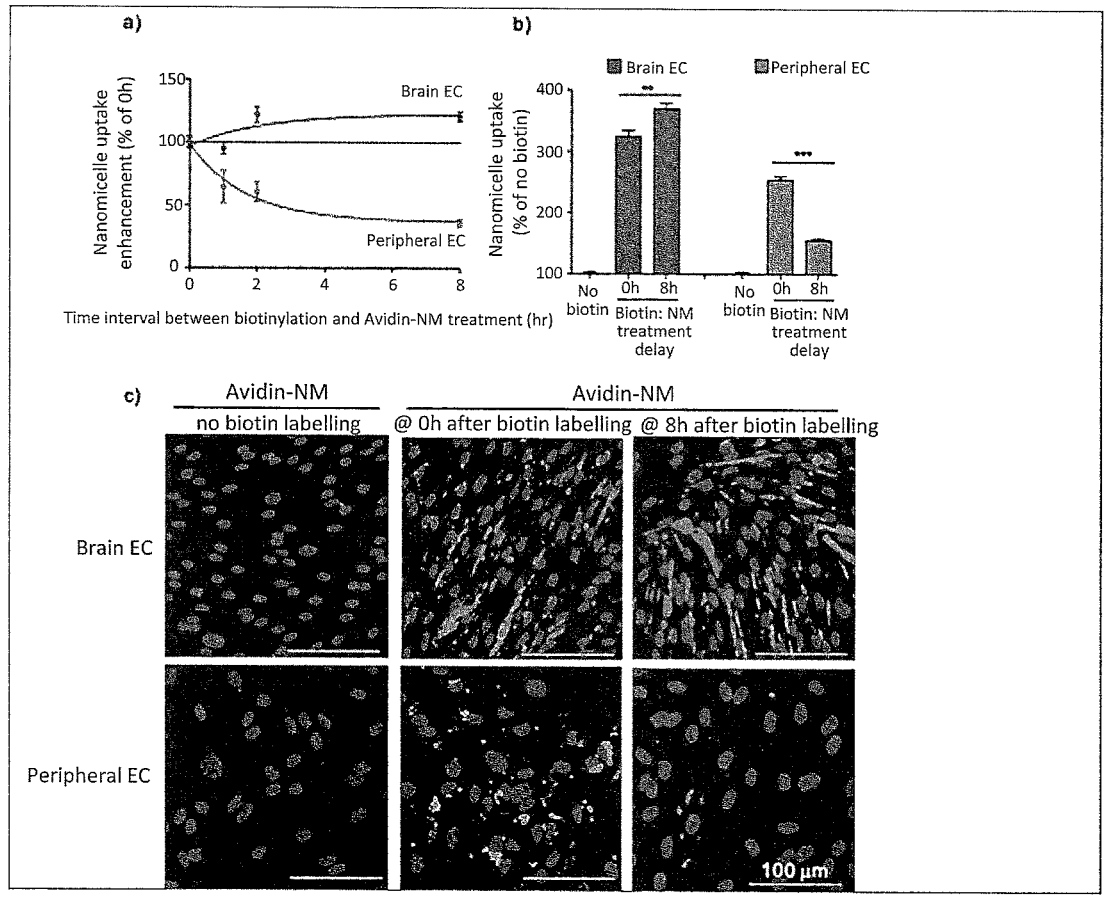
[Fig. 4]
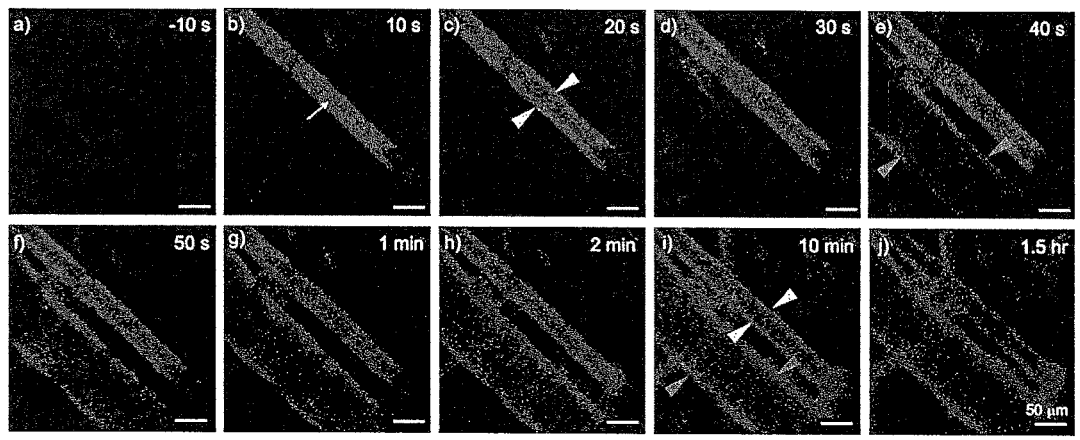

[Fig. 5]
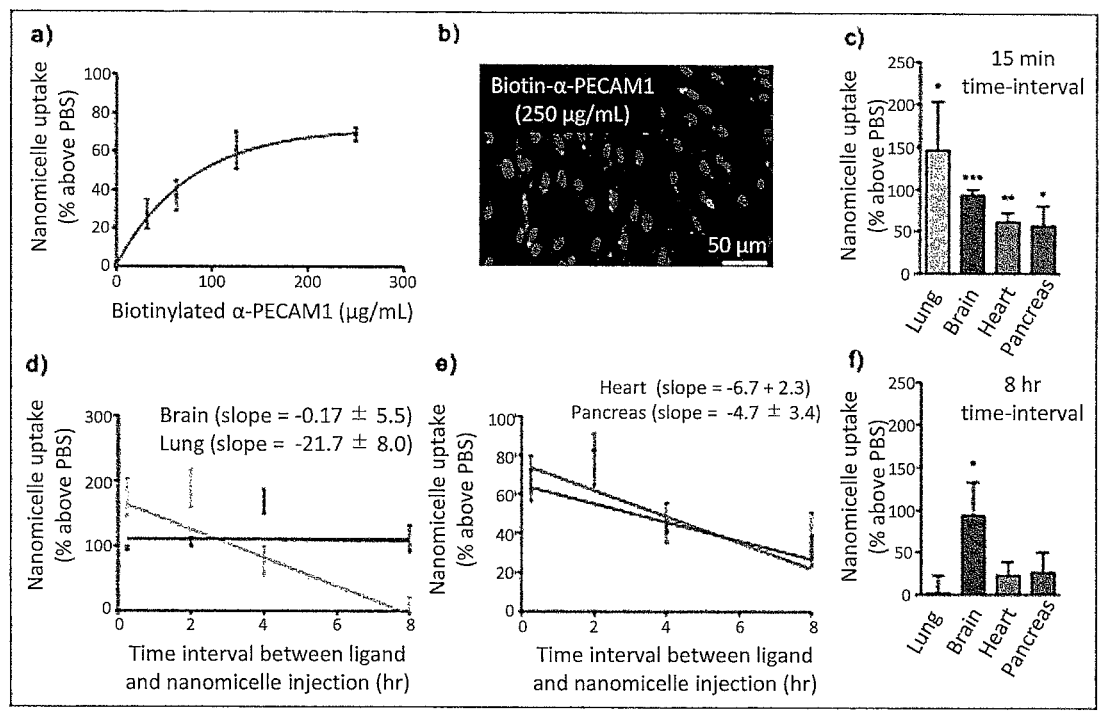

[Fig. 6]
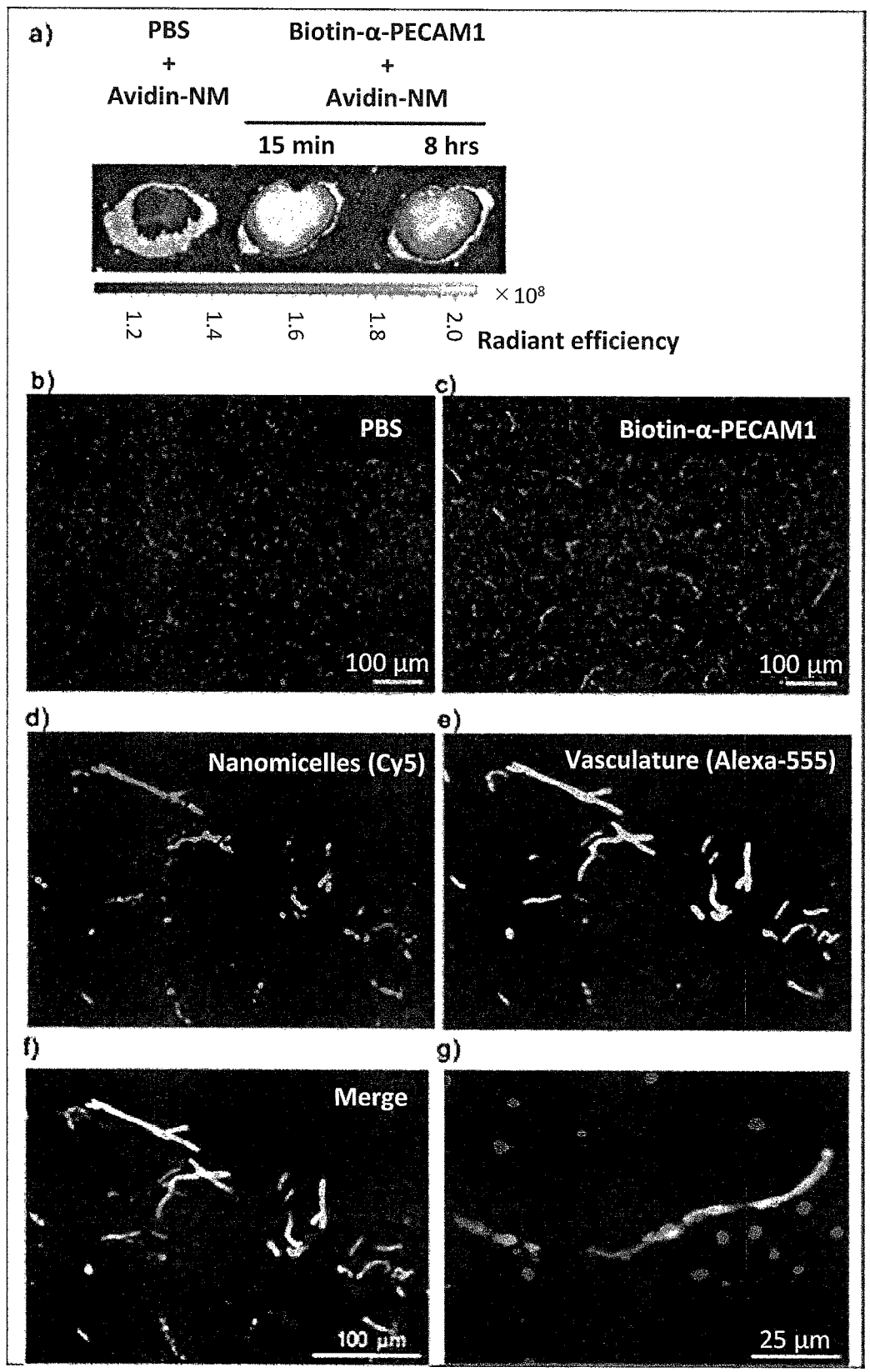

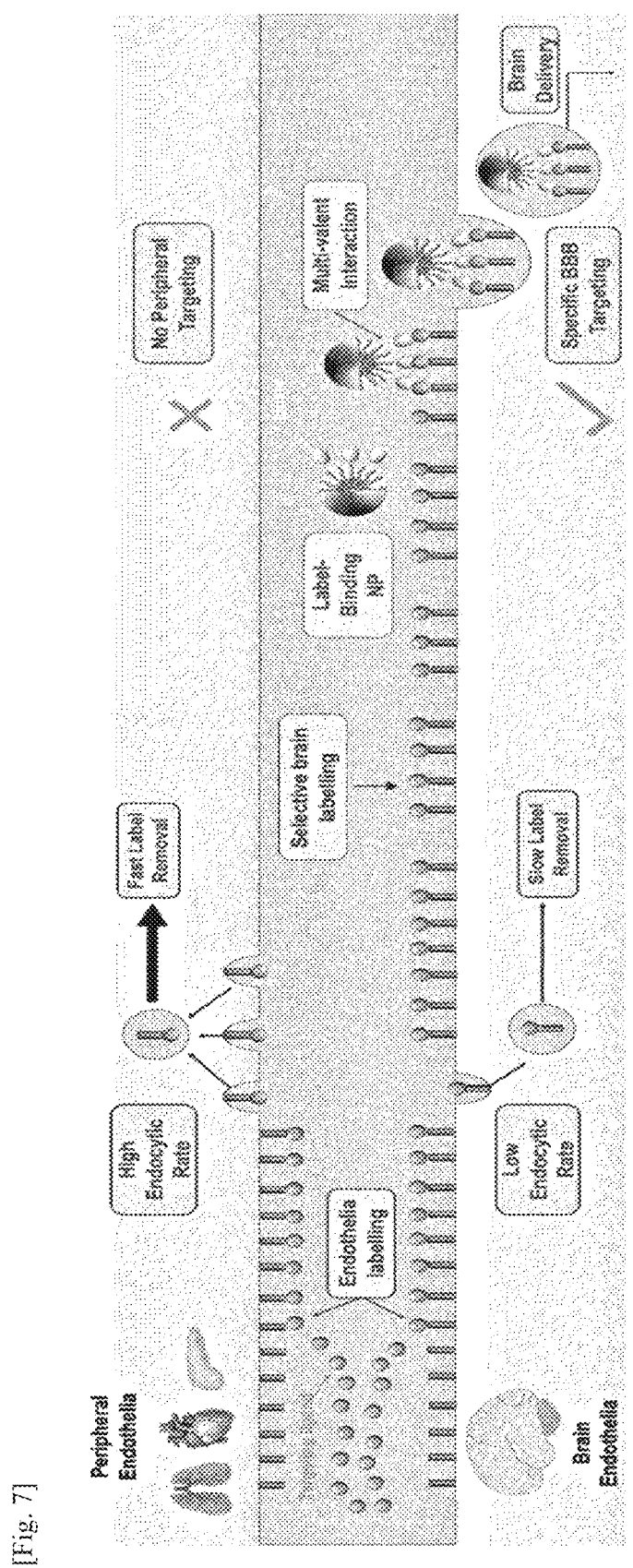
[Fig. 7]

[Fig. 8]
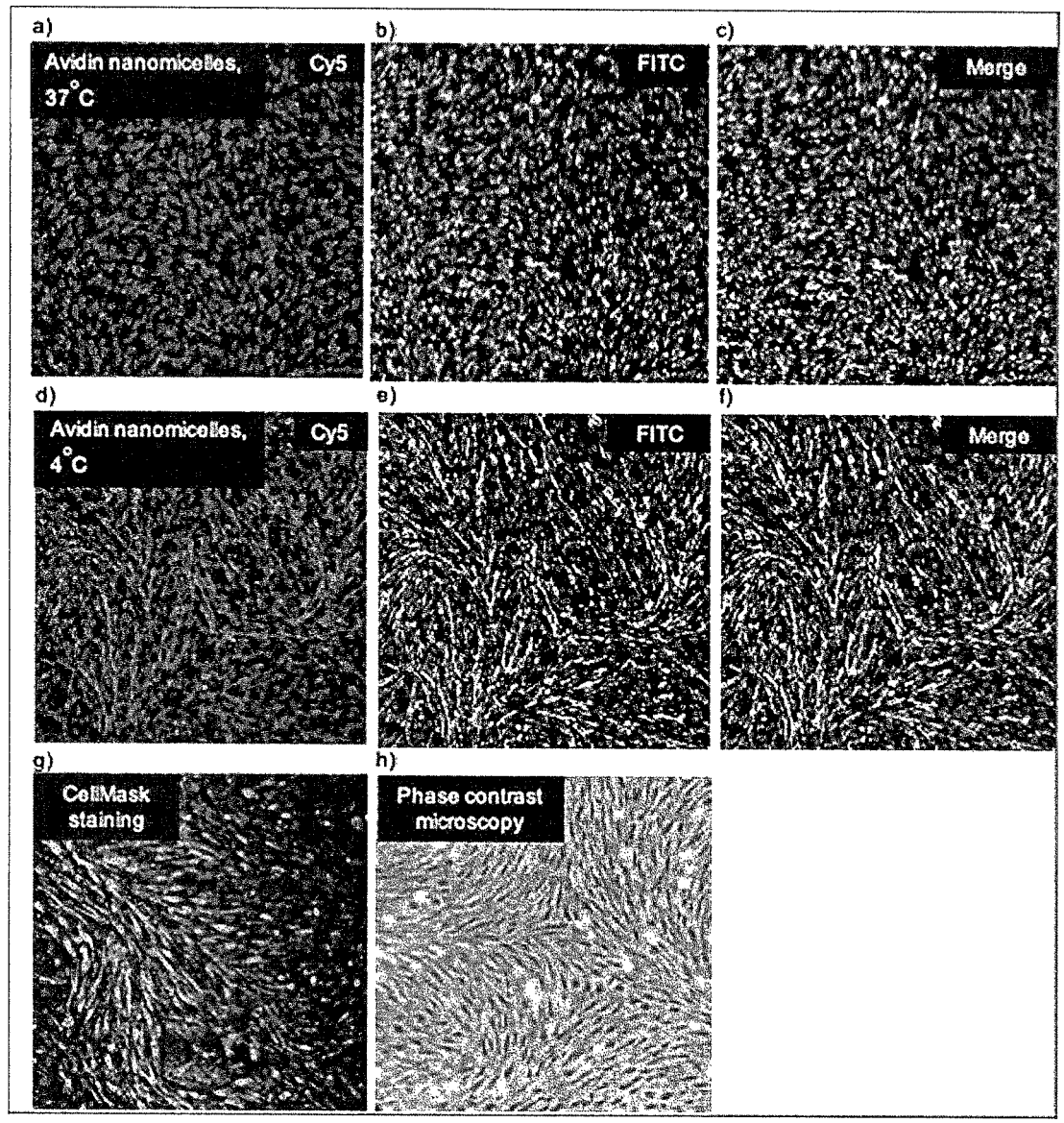

[Fig. 9]
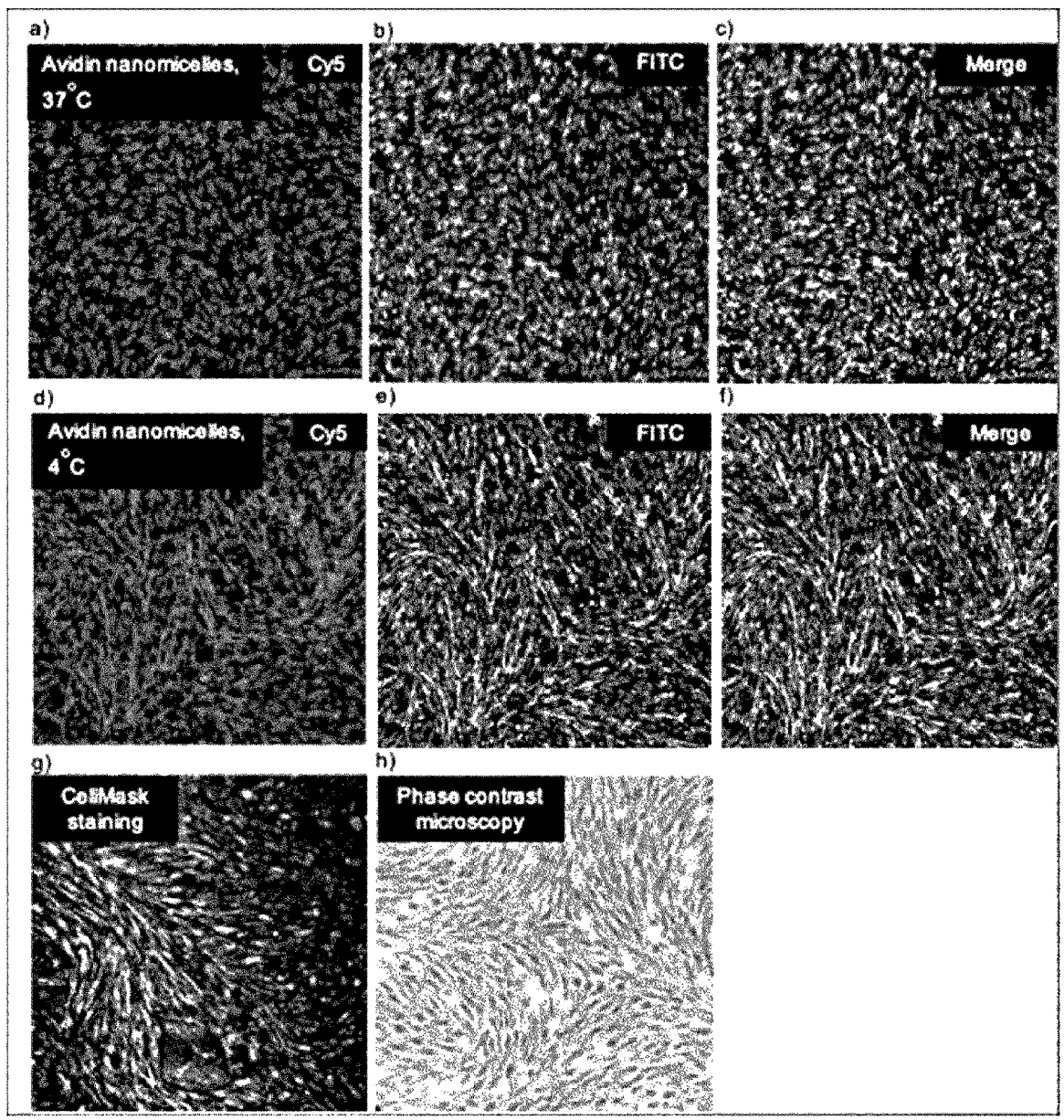

[Fig. 10]
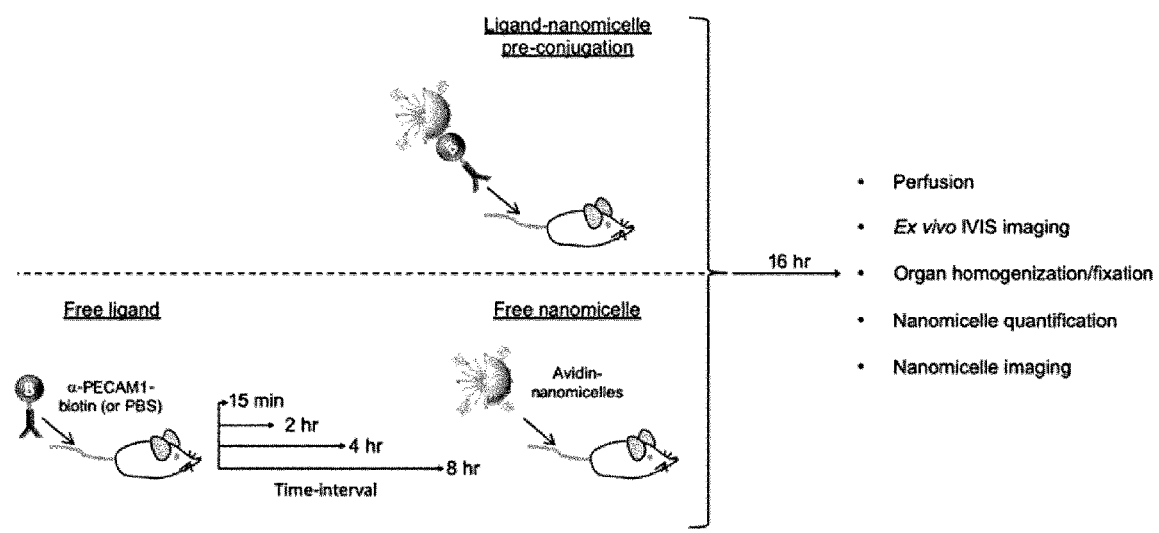

[Fig. 11]
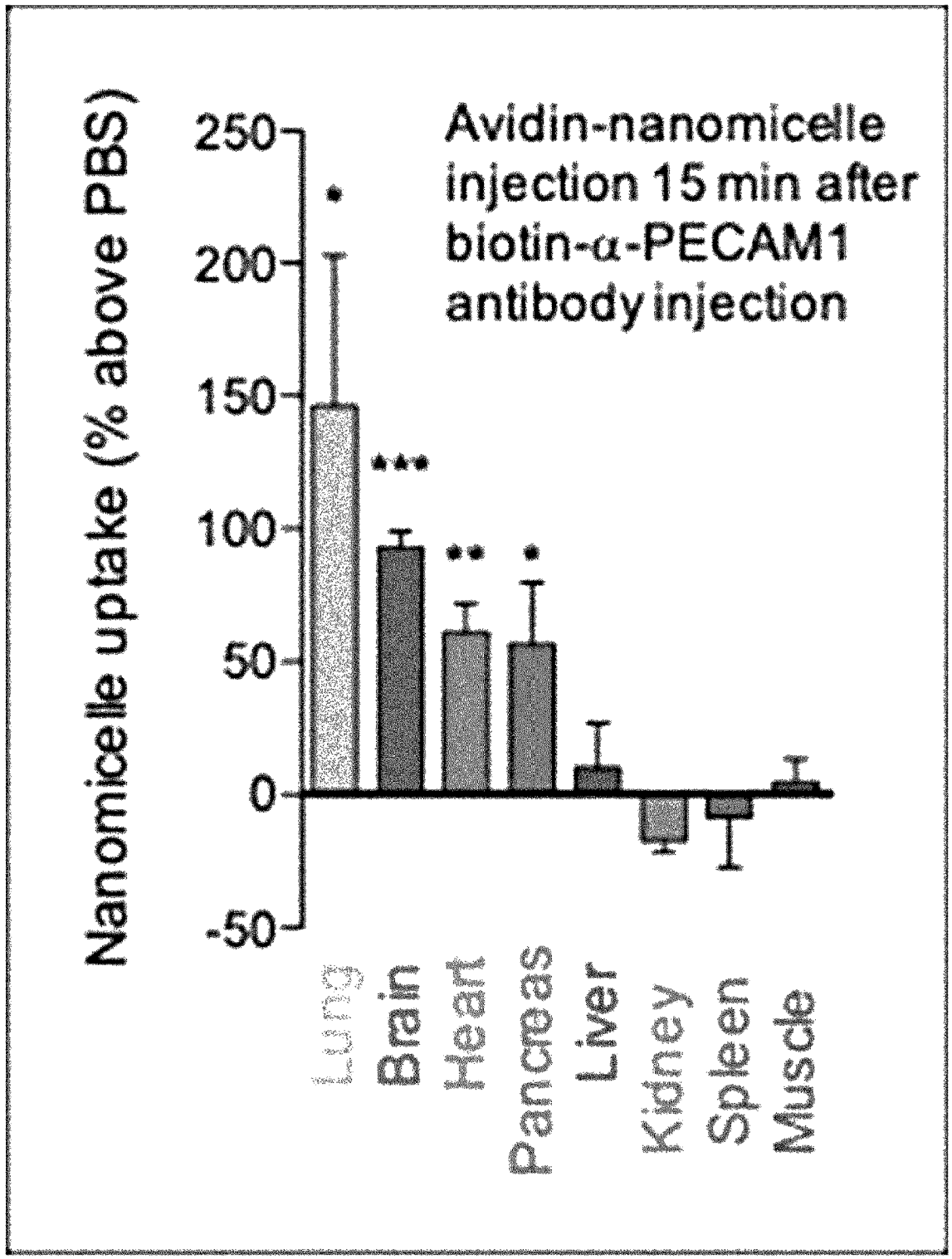

[Fig. 12]
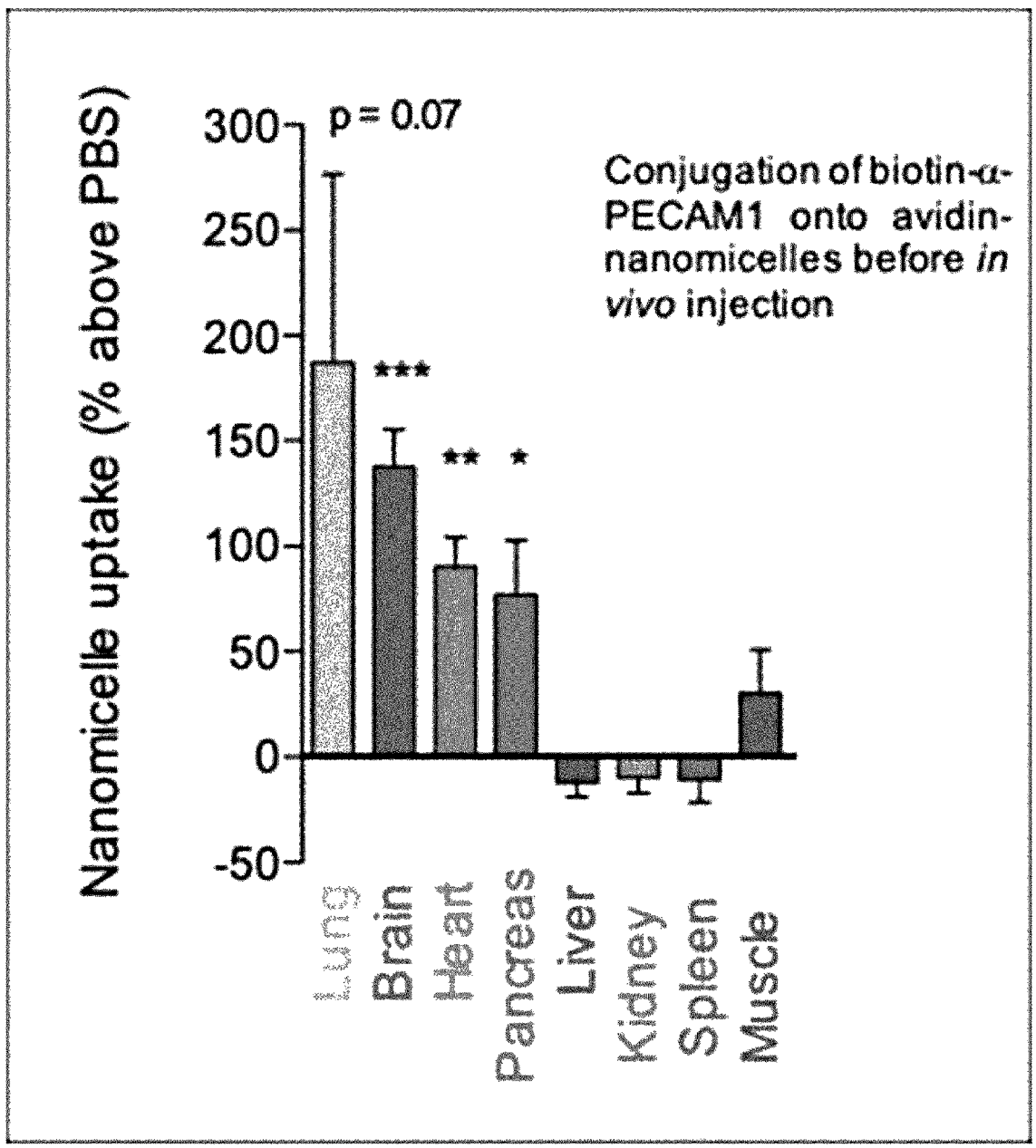

[Fig. 13]
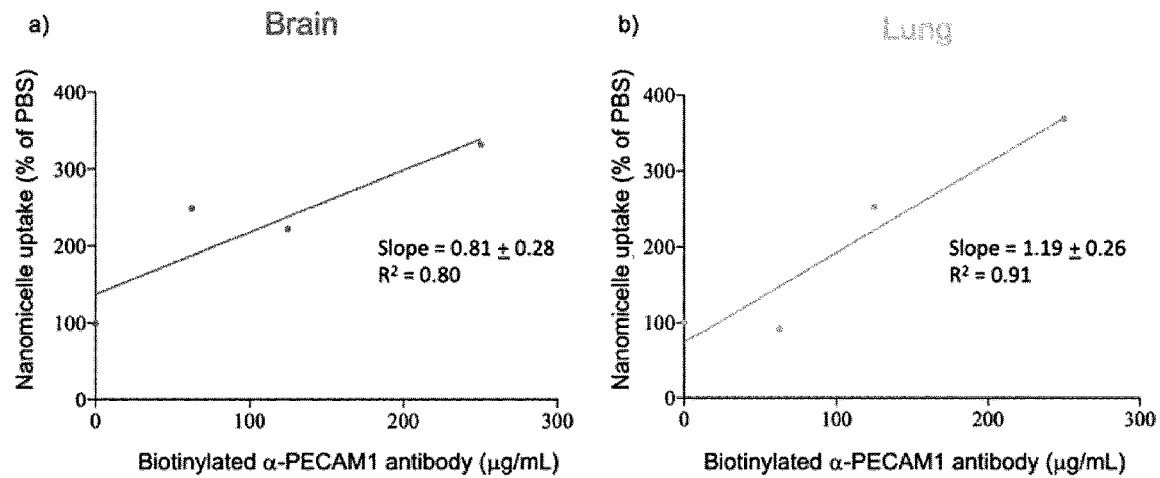
[Fig. 14]
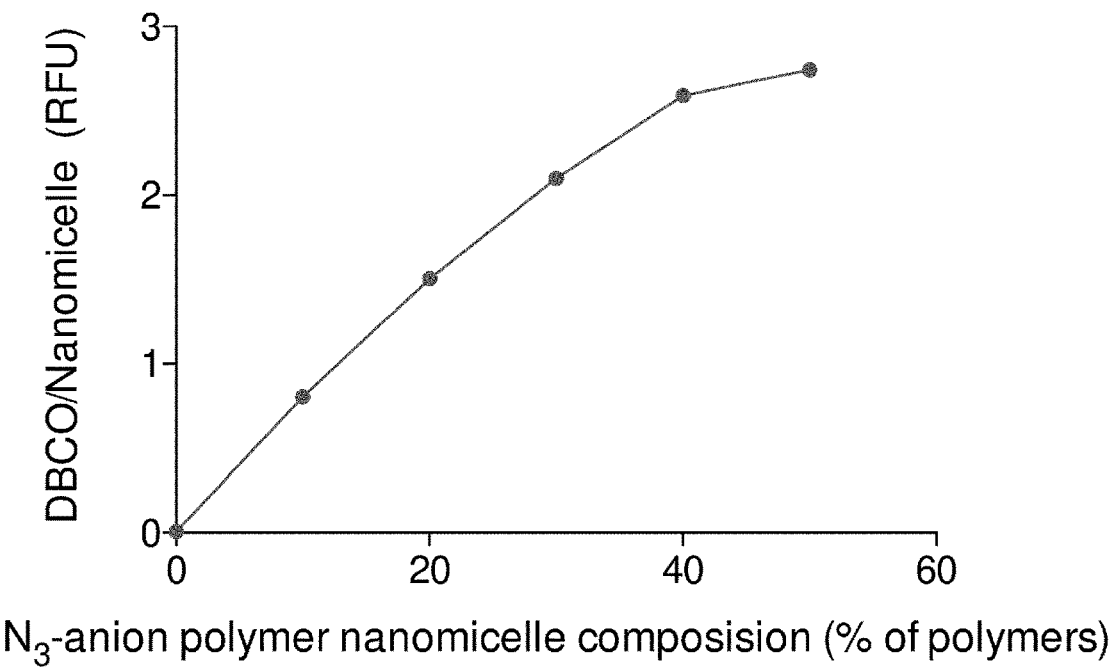

[Fig. 15]
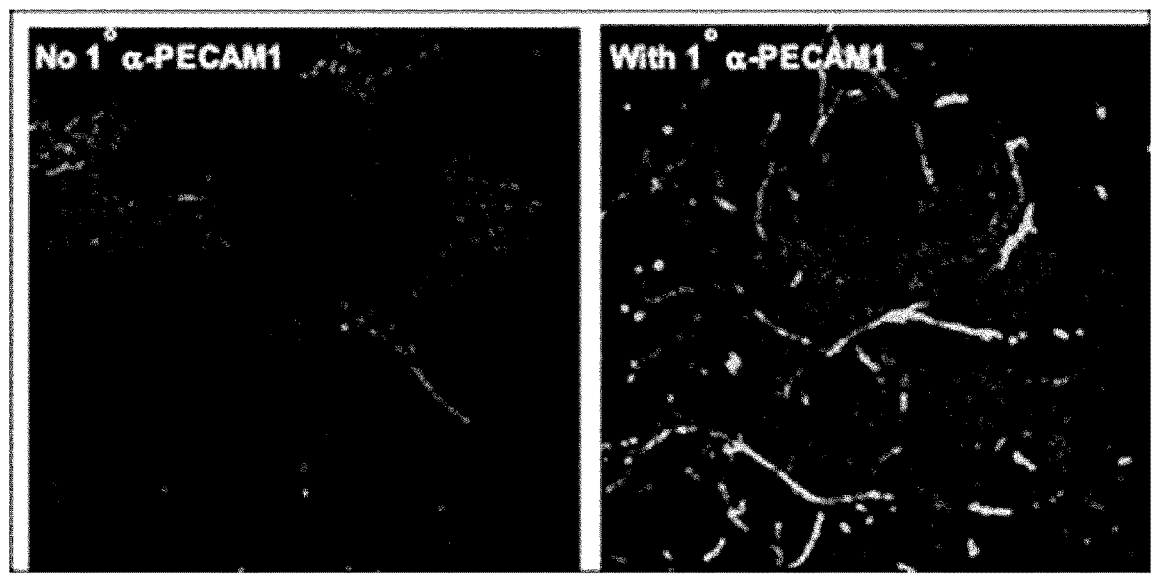

METHOD OF ADMINISTERING A NANOPARTICLE

CROSS REFERENCE TO RELATED APPLICATIONS

This application is a National Stage entry under 35 U.S.C. § 371 of PCT/JP2021/011290, filed on Mar. 19, 2021, and claims priority to Japanese Patent Application No. 2020-055478, filed on Mar. 26, 2020. The entire contents of both are incorporated herein by reference.

TECHNICAL FIELD

The disclosure relates to a method of administering a nanoparticle. The disclosure also relates to a method of labeling or targeting the surface of endothelial cells (or the surface of vasculatures) in the brain. The disclosure also relates to a method of targeting or delivering a nanoparticle into a brain parenchyma through blood-brain barrier (BBB) with minimal targeting to other peripheral organs.

BACKGROUND ART

Treatment of neurological diseases, such as Alzheimer's disease and Parkinson's disease, is severely hindered by the poor penetration of the vast majority of potential therapies into the brain due to the presence of the blood-brain barrier (BBB), a highly impermeable cellular barrier composed primarily by the specialized endothelial cells lining the brain microvasculature (Palmer, 2011; Abbott et al., 2010). Therefore, strategies are needed to actively and specifically transport therapies across the BBB to successfully combat these conditions. The application of nanotechnology in the medical field has achieved modest success in delivering therapies into the brain by designing nanoparticles conjugated with ligands targeting proteins associated with the BBB (e.g. LRP1, TfR1, Glut1, SLC7A5) (Tian et al., 2015; Johnsen et al., 2017; Anraku et al., 2017; Gonzalez-Carter et al., 2019). However, such strategies have significant brain specificity limitations, as protein expression is not limited to the BBB. For instance, LRP1/TfR1, Glut1 and SLC7A5 are also highly expressed on lung, kidney and intestine epi/endothelium, respectively (Kim et al., 2012; Lin et al., 2016; Farrell et al., 1992; Fraga et al., 2005), leading to high 'off-target' accumulation of functionalized nanoparticles into peripheral organs (Lam et al., 2018). Exemplifying such limitation, Wu et al. (2019) have recently shown functionalization of nanocarriers with peptide ligands targeting TfR1 significantly increases nanocarrier accumulation in the brain (c. 3×fold). However, peptide functionalization resulted in stronger targeting (c. 10×fold) of nanocarriers into the lung. Peripheral accumulation limits the clinical translation of therapies due to reduced effective dose reaching the brain and increased peripheral toxicity and detrimental side-effects (Sevigny et al., 2016; Nutt et al., 2003). Therefore, novel strategies which harness alternative BBB characteristics other than expression levels of BBB-associated proteins are required to achieve truly specific brain targeting of nanoparticles with minimal increase in peripheral uptake, thereby allowing efficient delivery of therapeutic compounds into the brain for successful clinical translation of therapies against brain disorders.

SUMMARY OF INVENTION

The present invention provides a method of administering a nanoparticle. The disclosure also relates to a method of labeling or targeting the surface of endothelial cells or the surface of vasculatures in the brain. The present invention provides a method of targeting or delivering a nanoparticle into a brain parenchyma through blood-brain barrier (BBB) with minimal targeting to other peripheral organs.

The present inventors exploit this differential endocytic rate to selectively label the brain microvasculature by firstly binding a biotinylated antibody (bAb) that binds to a protein (PECAM1) which is expressed in the vasculature of both the brain and peripheral organs. Secondly, due to the slow endocytic rate in brain endothelial cells, the bAb-PECAM1 complex is selectively retained on the surface of brain endothelial cells, after it is rapidly removed (internalized) from peripheral endothelial cells, resulting in the generation of brain-specific biotin targets. By designing avidin-decorated nanoparticles capable of efficiently binding the biotin-targets, the present invention can specifically target nanoparticles to the brain with minimal targeting to peripheral organs.

The present invention provides the invention described below.

(1) A method of administering a nanoparticle to a subject, comprising:
administering to the subject an effective amount of an antibody that binds to an antigen expressed on the surface of a brain endothelial cell such that a sufficient amount of the antibody can bind to the surface of the brain endothelial cell, wherein the antibody is conjugated to a $1^{st}$ molecule; and then,
administering to the subject a nanoparticle that is coated with a $2^{nd}$ molecule that can bind to the $1^{st}$ molecule under the physiological condition in brain blood vessel such that the nanoparticle can bind to the $1^{st}$ molecule that has attached to the surface of the brain endothelial cell,
wherein the nanoparticle is administered after the completion of the administration of the antibody.

(2) The method according to (1) above, wherein the nanoparticle is administered 1 hour or more after the administration of the antibody.

(3) The method according to (1) or (2) above, wherein the antigen is a membrane-bound protein.

(4) The method according to (3) above, wherein the membrane-bound protein is an endothelial cell surface marker protein.

(5) The method according to (3) above, wherein the membrane-bound protein is PECAM-1.

(6) The method according to any one of (1) to (5) above, wherein the $1^{st}$ molecule is biotin and $2^{nd}$ molecule is avidin.

(7) A combination kit comprising:
an antibody that binds to an antigen expressed on the surface of a brain endothelial cell, wherein the antibody is conjugated to a $1^{st}$ molecule; and
a nanoparticle that is coated with a $2^{nd}$ molecule that can bind to the $1^{st}$ molecule under the physiological condition in brain blood vessel,
wherein the nanoparticle can bind to the antibody that has attached to the surface of a brain endothelial cell through the interaction between the $1^{st}$ molecule and the $2^{nd}$ molecule.

(8) A pharmaceutical composition, which is to be administered to a subject who has been administered with an antibody that binds to an antigen expressed on the surface of a brain endothelial cell, wherein the antibody is conjugated to a $1^{st}$ molecule and has the antibody binding to the surface of the brain endothelial cell in the subject, comprising:

a nanoparticle that is coated with a $2^{nd}$ molecule that can bind to the $1^{st}$ molecule under the physiological condition in brain blood vessel, wherein the nanoparticle can bind to the antibody that has attached to the surface of a brain endothelial cell through the interaction between the $1^{st}$ molecule and the $2^{nd}$ molecule.

(9) A pharmaceutical composition, comprising an antibody that can bind to an antigen expressed on the surface of a brain endothelial cell, wherein the antibody is conjugated to a $1^{st}$ molecule, wherein the pharmaceutical composition is to be administered before administering to a subject a nanoparticle that is coated with a $2^{nd}$ molecule that can bind to the $1^{st}$ molecule under the physiological condition in brain blood vessel, wherein the nanoparticle can bind to the antibody that has attached to the surface of a brain endothelial cell through the interaction between the $1^{st}$ molecule and the $2^{nd}$ molecule.

The present invention provides the invention described below.

(1) A method of targeting nanoparticles to the brain in subjects, comprising a first administration step and a second administration step:

wherein the first administration step is administering to the subject a biotin-labelled antibody which binds to an antigen (e.g., PECAM1) expressed at least on a part of or throughout the body's vasculature, but which antigen is selectively retained on the surface of brain endothelial cells after the label or target on the surface of peripheral vasculature reduces or disappears, thereby generating brain-specific target or label (e.g., biotin) on the surface of brain vasculature;

wherein the second administration step is administering to the subject a nanoparticle decorated with a molecule (e.g., avidin protein) that efficiently binds the generated the brain-specific label or target under physiological conditions; and wherein the second administration step is performed after the first administration step.

(2) The method according to (1) above, wherein the nanoparticle is administered 1 hour or more after the administration of the antibody.

(3) The method according to (1) or (2) above, wherein the antigen is a membrane-bound protein.

(4) The method according to (3) above, wherein the membrane-bound protein is an endothelial cell surface marker protein.

(5) The method according to (3) above, wherein the membrane-bound protein is PECAM-1.

(6) The method according to any one of (1) to (5) above, wherein the $1^{st}$ molecule is biotin and $2^{nd}$ molecule is avidin.

(7) A combination kit comprising:

an antibody that binds to an antigen expressed on the surface of brain endothelial cells, wherein the antibody is conjugated to a $1^{st}$ molecule; and a nanoparticle that is decorated with a $2^{nd}$ molecule that can bind to the $1^{st}$ molecule in a brain blood vessel under physiological conditions, wherein the nanoparticle can bind to the antibody that is retained on the surface of brain endothelial cells through the interaction between the $1^{st}$ molecule and the $2^{nd}$ molecule.

(8) A pharmaceutical composition, which is to be administered to a subject who has been administered with an antibody that binds to an antigen expressed on the surface of a brain blood vessel, wherein the antibody is conjugated to a $1^{st}$ molecule and has the antibody binding to the surface of the brain blood vessel in the subject, comprising: a nanoparticle that is decorated with a $2^{nd}$ molecule that can bind to the $1^{st}$ molecule on a brain blood vessel under physiological conditions, wherein the nanoparticle can bind to the antibody that is retained on surface of brain endothelial cells through the interaction between the $1^{st}$ molecule and the $2^{nd}$ molecule.

(9) A pharmaceutical composition, comprising an antibody that binds to an antigen expressed on the surface of a brain endothelial cell, wherein the antibody is conjugated to a $1^{st}$ molecule, wherein the pharmaceutical composition is to be administered before administering to a subject a nanoparticle that is decorated with a $2^{nd}$ molecule that can bind to the $1^{st}$ molecule on brain blood vessels under the physiological condition, wherein the nanoparticle can bind to the antibody that has attached to the surface of a brain endothelial cell through the interaction between the $1^{st}$ molecule and the $2^{nd}$ molecule.

BRIEF DESCRIPTION OF DRAWINGS

FIG. 1 shows synthesis and characterization of avidin-decorated polymeric nanomicelles (avidin-NM). Polymeric nanomicelles were assembled from oppositely charged ionic block-copolymers consisting of a poly(ethylene glycol) block attached to either an anionic (PEG-anion) or cationic (PEG-cation) poly-amino acid block. The nanomicelle structure was stabilized by crosslinking adjacent amino acid polymers through EDC coupling. PEG-anions were capped with an azide ($N_3$) group to allow binding of DBCO-linked proteins onto the nanomicelle surface through Click chemistry. PEG cations were tagged with a Cy5 fluorophore for fluorescence labelling of the nanomicelle core (a). The size and monodispersity of the protein-decorated nanomicelles was characterized through DLS (b) and TEM (c). Protein decoration was verified and quantified through FCS (through detection of FITC signal from free or nanomicelle-bound avidin, as well as Cy5 signal from nanomicelles) (d) and analytical ultracentrifugation (e). Results represent averages of six (b, d) or one (e) independent nanomicelle syntheses.

FIG. 2 shows energy-dependent internalization of avidin-NM into brain endothelial cells as a function of cell-surface biotin target generation or biotin labelling. The cell surface of primary rat brain endothelial cells was biotin labelled through NHS-biotin binding onto primary amines of cell surface proteins. Endothelial cells were then treated with avidin-NM or blank-NM for indicated time-periods before measuring nanomicelle uptake through fluorescence (Cy5) quantification (a). To examine the role of the biotin-avidin interaction and energy-dependent endocytosis on avidin-NM uptake, fluorescence was quantified following nanomicelle treatment (4 hr) of biotinylated or non-biotinylated endothelial cells incubated at 37° C. or 4° C. (b). Cellular internalization was confirmed through visualization of nanomicelle localization in PFa fixed cells through confocal laser scanning microscopy (c-h). Colocalization of the nanomicelle (Cy5) and avidin (FITC) fluorescence signals was employed to examine retention of the protein-nanoparticle complex during internalization (e-g). Results are displayed as mean±SEM of triplicate independent wells. *** denotes $p<0.001$ vs. respective column as determined by a one-way ANOVA with Tukey's post-hoc test.

FIG. 3 shows preferential in vitro targeting of avidin-NM into brain endothelial cells through retention of cell-surface biotin target or biotin labelling as a function of time. The cell surface of primary rat brain endothelial cells or peripheral endothelial cells (HUVEC) were labelled with biotin through NHS-biotin binding onto primary amines of cell surface proteins. Following indicated incubation periods to allow for biotin internalization (i.e. cell-surface removal), endothelial cells were treated with avidin-NM (90 mins) and nanomicelle uptake assessed through fluorescence (Cy5) quantification (a-b). Avidin-NM cellular uptake was verified in PFa fixed cells through confocal laser scanning microscopy (c). Results are displayed as mean±SEM of triplicate independent wells. , * denote p<0.01, 0.001 vs. respective column as determined by a student's t-test.

FIG. 4 shows in vivo vascular labelling by α-PECAM1 antibody. Balb/c mice were intravenously (tail-vein) injected with fluorescently labelled α-PECAM1 antibodies (eFluor450 fluorophore, 25 µg antibody injection). Antibody localization was detected in the ear vasculature through in vivo confocal laser scanning microscopy. Yellow arrow=arterial lumen, yellow and red arrowheads=arterial and venous vascular wall, respectively. Time measurements indicate time-points before and after antibody injection. Scale bars=50 µm. Images are from a single mouse representative of two mice.

FIG. 5 shows selective in vivo targeting of avidin-NM to the brain by retention of a biotinylated α-PECAM1 antibody (biotin-α-PECAM1) in the brain microvasculature. Primary brain endothelial cells were incubated (in vitro) with increasing concentrations of biotin-α-PECAM1 followed by incubation with avidin-NM. Nanomicelle uptake was assessed through fluorescence (Cy5) quantification after removal of non-internalized nanomicelles (a). Nanomicelle internalization was verified in PFa fixed cells through CLSM (b). Balb/c mice were intravenously (i.v.) injected with biotin-α-PECAM1 or PBS followed by i.v. avidin-NM injection after indicated time intervals. Mice were trans-hepatically/cardially perfused 16 hrs following nanomicelle injection and nanomicelle accumulation assessed through quantification of nanomicelle (Cy5) fluorescence in homogenized organs (c-e). Results are displayed as mean±SEM of triplicate independent wells (a) or 7 mice (5 for 15 min time-interval) (c-f). Slopes were calculated through linear regression analysis. *, , * denote p<0.05, 0.01, 0.001 vs. respective PBS condition, student's t-test.

FIG. 6 shows visualization of in vivo avidin-NM brain accumulation. Balb/c mice were intravenously injected with biotin-α-PECAM1 (or PBS) followed by intravenous avidin-NM injection 15 min or 8 hr following antibody injection. Mice were trans-hepatically/cardially perfused 16 hr following nanomicelle injection, and nanomicelle accumulation in freshly excised whole brains imaged through Cy5 fluorescence detection with an In Vivo Imaging System (IVIS) (a). Nanomicelle brain targeting (in 8 hr time-interval mice) was also visualized in cryosectioned fixed brain tissue (b-g). Immunohistochemical staining with an independent, non-biotinylated α-PECAM1 antibody was employed to corroborate nanomicelle localization within the microvasculature (d-g).

FIG. 7 shows a new nanoparticle brain-targeting strategy based on generation of brain-specific target or selective labelling of the brain microvasculature by exploiting the high impermeability of the blood-brain barrier. A free, unconjugated labeled ligand binds to cell surface proteins of both peripheral and blood-brain barrier (BBB) endothelial cells. Due to the low endocytic rate in brain endothelial cell, which is a crucial requirement for the high impermeability of the BBB, the target or label is selectively retained on the surface of brain endothelial cells, while it is rapidly removed (endocytosed) from the surface of peripheral endothelial cells, thereby generating brain-specific target or label. Hence, nanoparticles capable of efficiently recognizing the displayed target or label are targeted specifically into brain endothelial cells with no 'off-target' accumulation increase into peripheral organs.

FIG. 8 shows energy-dependent internalization of avidin-NM into biotin-labelled brain endothelial cells. The cell surface of primary rat brain endothelial cells was biotin labelled through NHS-biotin binding onto primary amines of cell surface proteins. Endothelial cells were treated with avidin-NM (4 hr) at 37° C. (a-c) or 4° C. (d-f). Nanomicelle localization was visualized confocal laser scanning microscopy. Colocalization of the nanomicelle (Cy5) and avidin (FITC) fluorescence signals was employed to examine retention of the protein-nanoparticle complex during internalization. Cell bodies were imaged through fluorescent CellMask staining (g) or phase contrast microscopy (h).

FIG. 9 shows avidin-NM entry into biotin-labelled peripheral endothelial cells. The cell surface of HUVEC cells was biotinylated with an NHS-biotin reagent and the cells were treated with avidin-nanomicelles or blank-nanomicelles (120 min) at 37° C. or 4° C. Nanomicelle uptake was assessed through Cy5 fluorescence quantification (a). Nanomicelle cellular internalization was corroborated through confocal laser scanning microscopy detection of nanomicelle (Cy5) or avidin (FITC) fluorescence signal (b-g). Results are displayed as mean±SEM of independent triplicate measurements. **, denote p<0.01, 0.001 vs. respective column, as determined by a one-way ANOVA with Tukey's post-hoc test. Cell bodies were imaged through fluorescent CellMask staining (g) or phase contrast microscopy (h).

FIG. 10 shows in vivo experimental protocol to examine generation of brain targeting through selective labelling of the brain microvasculature. Balb/c mice were intravenously (tail vein) injected with avidin-decorated nanomicelles (avidin-NM) pre-conjugated to biotinylated α-PECAM-1 antibody ligand (top panel). Alternatively, mice were injected with free (i.e. unconjugated) biotin-α-PECAM1 (or PBS) followed by intravenous avidin-NM injection at increasing time-intervals. Mice were trans-hepatically and trans-cardially perfused (PBS) 16 hr following nanomicelle injection and nanomicelle organ accumulation assessed through Cy5 fluorescence quantification in whole organs (through IVIS) and tissue homogenates, and nanomicelle localization visualized through confocal laser scanning microscopy of immunostained fixed (PFa) tissue.

FIG. 11 shows biodistribution of avidin-NM injected 15 min after intravenous injection of biotinylated α-PECAM1 (biotin-α-PECAM1) antibody. BALB/c mice were intravenously injected (tail-vein) with biotin-α-PECAM1 (25 µg) (or PBS) followed by avidin-NM intravenous injection (200 µg) 15 min after antibody injection. Mice were trans-hepatically/cardially perfused 16 hr following nanomicelle injection and nanomicelle accumulation assessed through nanomicelle fluorescence (Cy5) quantification in organ homogenates. Results are displayed as mean±SEM of 5 mice. *, , * denote p<0.05, 0.01, 0.001 vs. respective PBS value, as determined by a student's t-test.

FIG. 12 shows biodistribution of avidin-NM pre-conjugated with biotin-α-PECAM1 before intravenous injection. BALB/c mice were intravenously injected (tail-vein) with avidin-NM pre-conjugated with biotin-α-PECAM1 (200 µg nanomicelles) (or PBS) followed by trans-hepatically/cardially perfusion 16 hr following nanomicelle injection. Nanomicelle accumulation assessed through nanomicelle fluorescence (Cy5) quantification in organ homogenates. Results are displayed as mean±SEM of 3 or 4 mice. *, , * denote p<0.05, 0.01, 0.001 vs. respective PBS value, as determined by a student's t-test.

FIG. 13 shows dose-dependent organ targeting of avidin-nanomicelles by biotinylated anti-PECAM1 antibody ligand (biotin-α-PECAM1). Balb/c mice were intravenously injected with increasing concentrations of biotin-α-PECAM1 15 mins before intravenous injection of avidin-nanomicelles (1 mg/mL, 200 µL). Thirty minutes following nanomicelle injection, mice were trans-hepatically/cardially perfused and the Cy5 fluorescence in the brain and lung homogenates quantified to assess nanoparticle accumulation. (n=1).

FIG. 14 shows DBCO binding by polymeric nanomicelles as a function of $N_3$ decoration. Polymeric nanomicelles with increasing degree of $N_3$-group decoration on their surface were created by varying the ratio of $N_3$-capped anionic polymers to uncapped (i.e. MeO-terminated) anionic polymers during nanomicelle assembly. Nanomicelles were then reacted with fluorescently labelled DBCO molecules and DBCO incorporation calculated through fluorescence quantification.

FIG. 15 shows specific vascular staining by non-biotinylated α-PECAM1 antibody. To ensure vascular visualization was due to the primary α-PECAM1 antibody employed during immunostaining and not cross reactivity with the biotinylated α-PECAM1 antibody used for nanomicelle targeting, immunostaining was carried out in the absence (a) or presence (b) of primary-PECAM1 antibody.

DETAILED DESCRIPTION OF INVENTION

The term "subject" as used herein refers to a mammal, including dog, cat, cow, pig, horse, donkey, sheep, and primate such as monkey, gorilla, chimpanzee, orangutan, bonobo, and human.

The term "nanoparticle" as used herein refers to a particle having a size of nano meter order, for example, 10 to 1000 nm, 10 to 900 nm, 10 to 800 nm, 10 to 700 nm, 10 to 600 nm, 10 to 500 nm, 10 to 400 nm, 10 to 300 nm, 10 to 200 nm, 10 to 100 nm, 10 to 90 nm, 10 to 80 nm, 10 to 70 nm, 10 to 60 nm, 20 to 50 nm, or 30 to 40 nm.

The term "particle" as used herein refers to a particle with or without lumen inside the particle. The particle includes, but not limited to, dendrimer, vesicle, micelle, liposome, polyioncomplex, polyioncomplex micelle (PIC micelle), and polyioncomplex polymersome (PICsome).

The term "vesicle" as used herein refers to a micelle or a hollow fine particle. The vesicle preferably has a biocompatible shell. A vesicle such as PICsome and liposome may encapsulate an active pharmaceutical ingredient such as low-molecular weight compound, protein such as enzyme, a nucleic acid, and an antibody or an antigen-binding fragment thereof. The term "antigen-binding fragment" means a part of an antibody keeping a binding ability to an antigen. The antigen-binding fragment may contain either one or both of a heavy chain variable region and a light chain variable region of the antibody of the present invention. The antigen-binding fragment may be a chimera or humanized. Examples of the antigen-binding fragment include Fab, Fab', F(ab')$_2$, Fv, scFv (single chain Fv), a diabody and sc (Fv)$_2$ (single chain (Fv)$_2$). A fragment of such an antibody, which is not particularly limited, can be obtained, for example, by treating an antibody with an enzyme. For example, if an antibody is digested with papain, Fab can be obtained. Alternatively, if an antibody is digested with pepsin, F(ab')$_2$ can be obtained. If F(ab')$_2$ is further reduced, Fab' can be obtained. In the present invention, a fragment of such an antibody, capable of binding to an antigen can be used.

In the present specification, the "polyion complex" (hereinafter, also referred to as "PIC") is an ion layer formed between a cationic block and an anionic block of two block copolymers as a result of mixing a copolymer of PEG and the anionic block and a copolymer of PEG and the cationic block in an aqueous solution so as to neutralize the charges. The bonding between PEG and each of these charged chains is aimed at preventing the polyion complex from being precipitated by aggregation and at thereby allowing the polyion complex to form a nanoparticle having a monodisperse core-shell structure having a particle size of several tens of nm. In addition, PEG shells prevent protein adsorption onto nanoparticles in vivo, thereby allowing high biocompatibility and an improved blood retention time. It has been revealed that one of the charged block copolymers does not require the PEG moiety for the polyion complex formation, and this PEG moiety may be replaced with a homopolymer, a surfactant, a nucleic acid, and/or an enzyme. Furthermore, in the polyion complex formation, at least one of the anionic polymer and the cationic polymer is copolymerized with PEG, or both of these polymers may be copolymerized with PEG. As well-known, an increased content of PEG facilitates forming a PIC micelle, while a decreased content of PEG facilitates forming PICsome. Examples of the anionic polymer or block that is often used in the preparation of the polyion complex include polyglutamic acid, polyaspartic acid, and nucleic acids (e.g., DNA, mRNA, and siRNA). Examples of the cationic polymer or block include polylysine and poly(5-aminopentylaspartic acid). In this context, the mRNA means messenger RNA that is used in protein synthesis through translation. The siRNA means double-stranded RNA (nucleic acid) that can induce RNA interference (RNAi). The siRNA is not particularly limited and is double-stranded RNA of 20 to 30 bp, preferably 21 to 23 bp, 25 bp, or 27 bp, and this double-stranded RNA has a sequence homologous to the sequence of a target gene.

The term "polyion complex polymersome" (hereinafter, also referred to as "PICsome") as used herein means a hollow fine particle formed from a polyion complex. It is known that PICsome is preferably modified at the outer surface thereof with polyethylene glycol from the viewpoint of a blood retention time.

The term "micelle" as used herein means a vesicle formed from a single-layer molecular membrane. Examples of the micelle include a micelle formed from an amphipathic molecule such as a surfactant, and a micelle formed from a polyion complex (PIC micelle). It is known that the micelle is preferably modified at the outer surface thereof with polyethylene glycol from the viewpoint of a blood retention time. Examples of the polyion complex polymersome used in the present invention include PICsome for drug delivery. PICsome formed from a block copolymer is known as such PICsome for drug delivery. Examples of the block copolymer constituting the PICsome include a block copolymer of a PEG block and a polycation block and homopolyanion, and a block copolymer of a PEG block and a polyanion block and homopolycation. A biodegradable block copolymer is preferably employed. Various copolymers are known as such copolymers, and any of these copolymers may be used in principle. For example, a poly(aspartic acid-tetraethylenepentamine (Asp-TEP)) block copolymer and a polyethylene glycol-poly((5-aminopentyl)-aspartic acid) block copolymer can be used as, for example, highly biocompatible and biodegradable block copolymers. In the case of PICsome, the $2^{nd}$ molecule is linked to the end on the PEG side so that the $2^{nd}$ molecule is exposed on the outer surface of the PICsome.

The term "liposome" as used herein means a vesicle formed from a double-layer molecular membrane. The molecular membrane is normally a phospholipid bilayer.

The term "for drug delivery" as used herein means being biocompatible and rendering the vesicle capable of incorporating a drug. In the present specification, the term "for drug delivery" may mean use based on the effect of prolonging the blood retention time of a drug compared with the blood retention time of a naked drug.

The term "surface" in the context of brain endothelial cells or brain vasculatures means the luminal surface, which an antibody in blood stream is accessible to.

The term "glycemic control" as used herein refers to a control of blood glucose level in a subject. The glycemic control can be performed by fasting for a certain period, for example, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 25 hours, 26 hours, 27 hours, 28 hours, 29 hours, 30 hours, 31 hours, 32 hours, 33 hours, 34 hours, 35 hours, 36 hours, 37 hours, 38 hours, 39 hours, 40 hours, 41 hours, 42 hours, 43 hours, 44 hours, 45 hours, 46 hours, 47 hours, 48 hours, or more to achieve a low blood glucose level. The glycemic control can be performed by administering glucose or taking glucose-containing food.

The term "antibody" as used herein refer to an immunoglobulin and encompasses a polyclonal antibody and a monoclonal antibody. A preferred antibody is a monoclonal antibody. Although the origin of the antibody is not particularly limited, examples of the antibody include non-human animal antibodies, non-human mammal antibodies, and human antibodies. The antibody may be a chimera antibody, a humanized antibody, or a human antibody. In addition, the antibody may a bispecific antibody. The term "antibody" also includes a non-fragmented antibody (or full-length antibody or intact antibody) and an antigen-binding fragment thereof.

The term "antigen-binding fragment" as used herein means a part of an antibody in which the affinity to an antigen is maintained. The antigen-binding fragment can comprise the heavy chain variable region, the light chain variable region, or the both in the antibody of the present invention. The antigen-binding fragment may be chimerized or humanized. Examples of the antigen-binding fragment include Fab, Fab', F(ab')$_2$, Fv, scFv (single-chain Fv), diabody, and sc (Fv)$_2$ (single-chain (Fv)$_2$). Such antibody fragments can be obtained by, but not particularly limited to, treating the antibody with an enzyme. For example, digestion of an antibody with papain gives Fab. Alternatively, digestion of an antibody with pepsin gives F(ab')$_2$, and Fab' can be obtained by further reduction of the F(ab')$_2$. In the present invention, such antigen-binding fragments of an antibody can be used.

The term "effective amount" as used herein means an amount of an antibody that can induce a desirable effect of the antibody. The desirable effect is not limited to a therapeutic effect but include non-therapeutic effect.

The term "therapeutically effective amount" as used herein means an amount of a medicine effective for treating (prevention and therapy) of a disease or a condition. A therapeutically effective amount of a medicine can reduce the speed of worsening of a symptom of a disease or a condition, stop the worsening of the symptom, improve the symptom, cure the symptom, or suppress the onset or development of the symptom.

The term "blood-brain barrier" as used herein refers to a functional barrier that is located between blood circulation and the brain and has the penetration selectivity of materials. The entity of the blood-brain barrier is considered to be cerebrovascular endothelial cells (i.e., brain endothelial cells), etc. Although much remains unknown about the material penetration of the blood-brain barrier, glucose, alcohols, and enzymes are known to easily cross the blood-brain barrier. Fat-soluble substances or small molecules (having a molecular weight of, for example, smaller than 500 daltons) are considered to tend to more easily cross the blood-brain barrier than water-soluble molecules or polymers (having a molecular weight of, for example, 500 daltons or larger). Many therapeutic drugs for brain diseases and brain diagnostic drugs fail to cross the blood-brain barrier. This largely hinders the treatment of brain diseases, the analysis of the brain, etc.

The inventors also discover that an antibody that binds to a protein expressed on the surface of endothelial cells throughout the body is selectively retained on the surface of the brain endothelial cells after it is rapidly removed from peripheral endothelial cells due to the differential endocytic rate in brain endothelial cells compared to peripheral endothelial cells, leading to the antibody being displayed selectively on the surface of brain endothelial cells. Then, the inventors exploit the generated brain-specific targets (i.e. the surface-bound antibody selectively displayed on the surface of the brain endothelial cells) to specifically target into the brain nanoparticles capable of efficiently binding the surface-bound antibody.

In an embodiment, the present invention provides: a method of administering a nanoparticle to a subject (or targeting a nanoparticle to the brain in a subject), comprising:

administering to the subject an effective amount of an antibody that binds to an antigen expressed on the surface of a brain endothelial cell such that a sufficient amount of the antibody can bind to the surface of the brain endothelial cell, wherein the antibody is conjugated to a $1^{st}$ molecule; and then, administering to the subject a nanoparticle that is coated with a $2^{nd}$ molecule that can bind to the $1^{st}$ molecule under the physiological condition in brain blood vessel such that the nanoparticle can bind to the $1^{st}$ molecule that has attached to the surface of the brain endothelial cell, wherein the nanoparticles are administered after the completion of the administration of the antibody. The nanoparticle coated or decorated with a $2^{nd}$ molecule present the $2^{nd}$ molecule on the surface of the nanoparticle such that the $2^{nd}$ molecule will be accessible to another molecule such as a $1^{st}$ molecule.

In an embodiment, an antigen expressed on the surface of a brain endothelial cell includes, but not limited to, an antigen expressing on the surface of brain endothelial cells. The antigen can express on the surface of endothelial cells other than brain, or expresses exclusively on the surface of endothelial cells. The antigen can be a membrane-bound protein including an endothelial cell surface marker protein, such as cell surface transporters (e.g., SLC7A5), inter-endothelial junction proteins (e.g. PECAM1, occludin, claudin-5), and structural proteins (e.g. syndecan-4). The protein expressing on the surface of brain endothelial cells should be maintained on the brain endothelial cell surface due to the reduced endocytosis or limited recycling of the protein in the brain endothelial cells compared to other peripheral endothelial cells. In the present Examples described below, the protein can be endocytosed to be disappeared from the surface of the endothelial cells even when the protein remains bound by an antibody on endothelial cells other than brain endothelial cells. Thus, the protein bound by an antibody will be maintained on brain endothelial cells, while the protein bound by an antibody will disappear on endothelial cells other than brain endothelial cells. This will result in the differentiated presentation of the antibody on brain endothelial cells against endothelial cells other than brain endothelial cells, which means that the antibody binding to brain endothelial cells can be a good target of a nanoparticle to be delivered selectively into the parenchyma of the brain. In an embodiment, an antigen can be an antigen that is expressed on the surface of endothelial cells throughout the body. However, even in this embodiment, the antigen is selectively retained on the surface of brain endothelial cells, after the antigen reduces or disappears from the surface of endothelial cells in other peripheral tissues, thereby the labelled antibody generating a brain-specific label or target.

In an embodiment, the antibody is labelled with a $1^{st}$ molecule, which can be detected by a $2^{nd}$ molecule bound to the outer surface of a nanoparticle. Thus, the $1^{st}$ molecule and the $2^{nd}$ molecule can be selected from combinations of antigen (or tag) and antibody (or antibody against the tag) binding thereto, biotin and avidin such as neutravidin, streptavidin, and Strep-tag II. Tags include, but not limited to, FLAG tag, HA tag, Myc tag, and V5 tag, which can be bound by an antibody against one of these tags. A $1^{st}$ molecule and a $2^{nd}$ molecule must bind to each other under the physiological condition in brain blood vessel, and therefore, a nanoparticle coated with the $2^{nd}$ molecule can bind to the $1^{st}$ molecule conjugated to the antibody that has bind to the surface of brain endothelial cells. In the present invention, the $2^{nd}$ molecule is not an antigen binding molecule that can essentially bind to an antigen expressed on the surface of the brain endothelial cells in a subject.

An antibody that binds to a protein expressing on the surface of brain endothelial cells can remain expressing even at 8 hours after the intravenous administration of the antibody, while an antibody that binds to a protein expressing on the surface of endothelial cells other than brain endothelial cells rapidly disappear from the surface. In an embodiment, the administration of the nanoparticle coated with a $2^{nd}$ molecule is performed together with or just after the administration of the antibody conjugated to a $1^{st}$ molecule. In an embodiment, the administration of the nanoparticle coated with a $2^{nd}$ molecule is performed after the completion of the administration of the antibody conjugated to a $1^{st}$ molecule. In an embodiment, the administration of the nanoparticle coated with a $2^{nd}$ molecule is performed 10 minutes, 20 minutes, 30 minutes, 40 minutes, 50 minutes, and preferably 1 hour, 2 hours, 3 hours, 4 hours, 5 hours, 6 hours, 7 hours, 8 hours, or more after the start of the administration of the antibody conjugated to a $1^{st}$ molecule, or after the completion of the administration of the antibody conjugated to a $1^{st}$ molecule. In a preferable embodiment, at least a part of the nanoparticles are administered 10 minutes or more, 20 minutes or more, 30 minutes or more, 40 minutes or more, 50 minutes or more, and preferably 1 hour or more, 2 hours or more, 3 hours or more, 4 hours or more, 5 hours or more, 6 hours or more, 7 hours or more, 8 hours or more after the start of the administration of the antibody conjugated to a $1^{st}$ molecule; after the completion of the administration of the antibody conjugated to a $1^{st}$ molecule; or after a certain time interval after the completion of the administration of the antibody conjugated to a $1^{st}$ molecule. The certain time period is a time that is enough for the antibody to decrease or remove from the surface of endothelial cells other than brain endothelial cells. This interval of the $1^{st}$ administration and the $2^{nd}$ administration can be extended such that the selective incorporation into brain endothelial cells against the other endothelial cells will be achieved. The time interval as mentioned above may be 10 minutes or more, 20 minutes or more, 30 minutes or more, 40 minutes or more, 50 minutes or more, 1 hour or more, 2 hours or more, 3 hours or more, 4 hours or more, 5 hours or more, 6 hours or more, 7 hours or more, or 8 hours or more. The time interval as mentioned above may be 3 days or less, 2 days or less, 24 hours or less, 20 hours or less, 16 hours or less, or 8 hours or less. The time interval as mentioned above may be between 10 minutes and 3 days, and preferably, 8 hours. and 24 hours. This may help to reduce off-target delivery to endothelial cells in organs other than brain.

In an embodiment, a $1^{st}$ molecule and an antibody can be conjugated directly or through a $1^{st}$ linker. $1^{st}$ linkers include non-cleavable linkers and cleavable linkers, preferably a non-cleavable linker.

In an embodiment, a nanoparticle can be coated with a $2^{nd}$ molecule directly or through a $2^{nd}$ linker. $2^{nd}$ linkers include non-cleavable linkers and cleavable linkers, preferably a cleavable linker, for example, a linker cleavable under the reductive condition in the brain parenchyma and a linker cleavable under the low pH condition in the endosome. A linker cleavable under the reductive condition in the brain parenchyma can be an SS linker, wherein non-cleavable linkers are linked through a disulphide bond (an SS bond). A linker cleavable under the low pH condition in the endosome can be a linker having pH sensitive moiety which connects two noncleavable linkers at either ends. pH sensitive moiety can be suitably designed by those skilled in the art using well-known technology. Examples of pH sensitive moieties include, but not limited to, ester, sulfonate ester, boronate ester, phosphate ester, amide, acetal, ketal, hydrazone, imine, imide, enamine, and thiosuccinimidyl. The pH sensitive moiety can be cleaved in an endosome after the endocytosis of the nanoparticle. Those skilled in the art can design such a pH sensitive moiety by using the well-known technologies.

In a preferred embodiment, a nanoparticle is a nanomicelle such as PIC micelle or a vesicle such as a PIC some. PIC micelle can be formed with a cationic polymer and an anionic polymer, each preferably conjugated with a non-charged hydrophylic polymer. Non-charged hydrophylic polymer refers to a hydrophylic polymer having a neutralized charge in the whole molecule, for example, a hydrophylic polymer without a charged molecule, including polyalkylene glycole (such as polyethylene glycole), and further conjugated with a $2^{nd}$ molecule at an end of the polyalkylene glycole. When a nanoparticle is coated with a $2^{nd}$ molecule through a $2^{nd}$ linker that is cleavable, the nanoparticle can be further coated with a 3rd molecule that can bind to a surface protein expressing on a particular neuronal cell, and the 3rd molecule can be exposed to the surface of the nanoparticle particularly after the $2^{nd}$ linker is cleaved (see WO2017/002979). This may be achieved by using a linker having a bond that is cleavable under the condition in the brain parenchyma (i.e., reductive environment) between a $2^{nd}$ uncharged hydrophilic polymer block, and a polycation or polyanion block as a $2^{nd}$ linker and by using a 3rd uncharged hydrophilic polymer block and a polycation or polyanion block as a 3rd linker between the nanoparticle and the 3rd molecule, wherein the $2^{nd}$ uncharged hydrophilic polymer block is longer than the 3rd uncharged hydrophilic polymer block.

In an embodiment, Examples of polyanions which can be used to form a PICsome or PIC micelle includes poly-aspartic acid or poly-glutamic acid. In an embodiment, Examples of polycations which can be used to form a PICsome or PIC micelle includes poly-lysin, poly-ornithine, and the polymer of the formula (I):

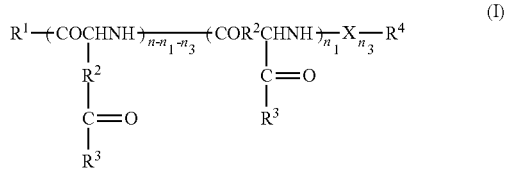

wherein
$R^1$ is polyethylene glycol and may be linked to an amino acid neighboring the polyethylene glycol through a linker,
$R^2$ is methylene or ethylene,
$R^3$ is a group represented by $-(NH-(CH_2)_2)_p-NH_2$, and p is 2, 3 or 4,
$R^4$ is hydrogen, a protecting group, a hydrophobic group, or a polymerizable group,
X is a cationic amino acid,
n is any integer from 2 to 5000,
$n_1$ is any integer from 0 to 5000,
$n_3$ is any integer from 0 to 5000,
$n-n_1-n_3$ is an integer equal to or greater than 0, and though the repeating units in the formula are shown in a particular order for convenience of description, the repeating units may be present in any order and the repeating units may be present at random, and the repeating units may be same or different.

In the formula (I) above, p is preferably 3 or 4, and most preferably 3 when the polymer of the formula (I) forms a PIC micelle with mRNA.

In the formula (I) above, examples of the protecting group include $C_{1-6}$ alkylcarbonyl groups, and the protecting group is preferably an acetyl group, and examples of the hydrophobic group include benzene, naphthalene, anthracene, pyrene and derivatives thereof or $C_{1-6}$ alkyl groups, and examples of the polymerizable group include a methacryloyl group and an acryloyl group. Methods for introducing the protecting group, the hydrophobic group and the polymerizable group into a block copolymer are well-known to those skilled in the art.

In the formula (I) above, though the average degree of polymerization of polyethylene glycol (PEG) is 5 to 20000, preferably 10 to 5000, and more preferably 40 to 500. The end of PEG of the cationic polymer may be protected by a hydroxy group, a methoxy group or a protecting group.

In the formula (I) above, the linker may be for example $-(CH_2)r-NH-$, wherein r is any integer from 1 to 5, or $-(CH_2)s-CO-$, wherein s is any integer from 1 to 5, and may be linked to the neighboring amino acid in the formula (I) preferably through a peptide bond. The linker may be preferably linked to PEG on the methylene side of PEG through an O atom of PEG.

In the formula (I) above, n is any integer from 0 to 5000, for example, any integer from 0 to 500; m is any integer from 0 to 5000, for example, any integer from 0 to 500; and m+n is any integer from 2 to 5000, for example, any integer from 2 to 500.

In one embodiment of the present invention, the cationic polymer may be a block copolymer of a PEG-linker-polycation block, where the PEG, the linker and the polycation block are as defined above.

In an aspect of the present invention, provided is a combination kit comprising: an antibody that binds to an antigen expressed on the surface of a brain endothelial cell, wherein the antibody is conjugated to a $1^{st}$ molecule; and a nanoparticle that is coated with a $2^{nd}$ molecule that can bind to the $1^{st}$ molecule under the physiological condition in brain blood vessel, wherein the nanoparticle can bind to the antibody that has attached to the surface of a brain endothelial cell through the interaction between the $1^{st}$ molecule and the $2^{nd}$ molecule. The combination kit can be used for a method of administering a nanoparticle according to the present invention. The present invention also provides use of an antibody that binds to an antigen expressed on the surface of a brain endothelial cell, wherein the antibody is conjugated to a $1^{st}$ molecule in the manufacture of the combination kit according to the present invention. The present invention also provides use of a nanoparticle that is coated with a $2^{nd}$ molecule that can bind to a $1^{st}$ molecule under the physiological condition in brain blood vessel in the manufacture of the combination kit according to the present invention.

In an aspect of the present invention, the present invention provides a pharmaceutical composition, which is to be administered to a subject who has been administered with an antibody that binds to an antigen expressed on the surface of a brain endothelial cell, wherein the antibody is conjugated to a $1^{st}$ molecule and has the antibody binding to the surface of the brain endothelial cell in the subject, comprising:

a nanoparticle that is coated with a $2^{nd}$ molecule that can bind to the $1^{st}$ molecule under the physiological condition in brain blood vessel, wherein the nanoparticle can bind to the antibody that has attached to the surface of a brain endothelial cell through the interaction between the $1^{st}$ molecule and the $2^{nd}$ molecule. The present invention provides use of an antibody that binds to an antigen expressed on the surface of a brain endothelial cell, wherein the antibody is conjugated to a $1^{st}$ molecule in the manufacture of the pharmaceutical composition according to the present invention in this aspect. The present invention also provides use of a nanoparticle that is coated with a $2^{nd}$ molecule that can bind to a $1^{st}$ molecule under the physiological condition in brain blood vessel in the manufacture of the pharmaceutical composition according to the present invention in this aspect.

In an aspect of the present invention, the present invention provides a pharmaceutical composition, comprising an antibody that binds to an antigen expressed on the surface of a brain endothelial cell, wherein the antibody is conjugated to a $1^{st}$ molecule, wherein the pharmaceutical composition is to be administered before administering to a subject a nanoparticle that is coated with a $2^{nd}$ molecule that can bind to the $1^{st}$ molecule under the physiological condition in brain blood vessel, wherein the nanoparticle can bind to the antibody that has attached to the surface of a brain endothelial cell through the interaction between the $1^{st}$ molecule and the $2^{nd}$ molecule. The present invention provides use of an antibody that binds to an antigen expressed on the surface of a brain endothelial cell, wherein the antibody is conjugated to a $1^{st}$ molecule in the manufacture of the pharmaceutical composition according to the present invention in this aspect. The present invention also provides use of a nanoparticle that is coated with a $2^{nd}$ molecule that can bind to a $1^{st}$ molecule under the physiological condition in brain blood vessel in the manufacture of the pharmaceutical composition according to the present invention in this aspect.

In an aspect of the present invention, the present invention provides an antibody that binds to an antigen expressed on the surface of a brain endothelial cell, wherein the antibody is conjugated to a $1^{st}$ molecule in a method of administering a nanoparticle according to the present invention. The present invention also provides a nanoparticle that is coated with a $2^{nd}$ molecule that can bind to a $1^{st}$ molecule under the physiological condition in brain blood vessel in a method of administering a nanoparticle according to the present invention.

In the present invention, the antibody or the nanoparticle can be administered parenterally (for example, intravenously). Therefore, the pharmaceutical composition or kit comprising the antibody or the nanoparticle according to the present invention can be formulated as a pharmaceutical composition or kit suitable for parenteral administration (for example, intravenous administration). For example, the pharmaceutical composition or kit can further comprise a pharmaceutically acceptable excipient besides the antibody or the nanoparticle according to the present invention. Examples of pharmaceutically acceptable excipients include, but not limited to, pharmaceutically acceptable salts, solvents such as water, buffering agents, tonicity agents, antioxidants, and smoothing agents.

In an embodiment, a method of the present invention can be performed without glycemic control. In an embodiment, the antibody is not an antibody that binds to GLUT1. In another embodiment, a method of the present invention can be performed with or without glycemic control.

EXAMPLES

Materials and Methods

Nanomicelle Synthesis and Avidin Decoration

Nanomicelles were assembled from oppositely charged block copolymers consisting of a poly(ethylene glycol) (PEG) (2.2k) segment tandemly coupled to either an anionic polypeptide (poly($\alpha,\beta$-aspartic acid)) or a cationic polypeptide (poly(5-aminopentyl-$\alpha,\beta$-aspartamide)) (average degree of polymerisation=75) segment. A reactive azide ($N_3$) group was attached to the $\alpha$-end of the PEG segment of anionic block copolymers (hereafter $N_3$-anions) to allow decoration of dibenzocyclooctyne (DBCO)-linked proteins through Click chemistry. A fraction of cationic block copolymers were tagged with a Cy5 fluorophore onto the w-end of the polypeptide chain (hereafter Cy5-cation) to allow for nanomicelle quantification and imaging. Copolymers were blended in 10 mM phosphate buffer (PB, pH 7.4) ($N_3$-anion: Cy5-cation: Untagged-cation volume ratio=10:4:16 at 1 mg/mL) to promote self-assembly of nanomicelles with a hydrophilic, non-charged PEG shell with azide reactive group surface decoration, and Cy5 fluorescence at the core of the nanomicelle. The nanomicelle structure was then stabilized by crosslinking cationic and anionic polypeptide segments with 1-ethyl-3-(3-dimethylaminopropyl) carbodiimide (EDC, 15 hr, room temperature), followed by washing through Vivaspin filters (100 kDa molecular weight cut-off, MWCO, PES membrane) (Sartorius, Germany) with 10 mM PB (pH 7.4) to remove EDC. The functionality of the decorating $N_3$ groups was confirmed by synthesizing nanomicelles with increasing percentage of $N_3$ anions (by varying the ratio of $N_3$-terminated to MeO-terminated anions) and reacting them with fluorescently labelled DBCO. As expected, increasing the percentage of $N_3$ anions composing the nanomicelle resulted in increased DBCO incorporation, with no incorporation seen for 0% $N_3$ nanomicelles (supplementary FIG. 7), thereby demonstrating the capacity of the $N_3$-decoration to mediate Click chemistry on the nanomicelle surface.

Deglycosylated tetrameric avidin (Neutravidin, 60 kDa MW, FITC-tagged) (ThermoFisher, USA) was reacted with maleimide-PEG4-DBCO (Mal-PEG4-DBCO) (×10 molar excess Mal-PEG4-DBCO) in 10 mM PB at pH 8.5 (15 hr, room temperature) to promote binding of maleimide onto primary amines on the protein (Brewer and Riehm, 1967). Unreacted Mal-PEG4-DBCO was removed by dialysis (3.6 kDa MWCO PES membrane) against 10 mM PB, pH 7.4 with 200 mM arginine (10 mM PB/Arg) to prevent protein aggregation.

DBCO-linked avidin was then attached to $N_3$-decorated nanomicelles by mixing at a 5:1 (protein:nanomicelle) molar ratio in 10 mM PB/Arg (15 hr, room temperature). Unreacted avidin proteins were removed by washing through Vivaspin filters (100 kDa MWCO) with 10 mM PB/Arg. To remove contaminating avidin aggregates, avidin-decorated nanomicelles were filtered through a 0.2 μm PES filter (Millipore, USA) with Dulbecco's phosphate buffered saline (D-PBS) without calcium or magnesium. Avidin-decorated nanomicelles (avidin-NM) were diluted to a concentration of 1 mg/mL (polymer weight) and kept in D-PBS to allow for direct in vivo injection.

Dynamic Light Scattering

Avidin-NM population size (hydrodynamic diameter) and dispersity were measured through dynamic light scattering (DLS) at 25° C. in D-PBS (1 mg/mL) with a Zetasizer Nano Zs90 ADD SCATTERING ANGLE (Malvern Instruments Ldt, UK) in a Malvern QS Quartz Cuvette (Zen2112).

Transmission Electron Microscopy (TEM)

TEM micrographs of the core structure of polymeric micelle were acquired with a JEM-1400 electron microscope (JOEL, Japan). Briefly, a copper TEM grid with a carbon-coated collodion membrane (Nisshin EM, Japan) was glow discharged in an Eiko IB-3 ion coater (Eiko, Japan). The grid was captured with forceps at its carbon side up by gripping the outermost edge. Two microliters of the polymeric micelle solution were applied onto the grid, followed by mixing of 2 microliters of uranyl acetate (UA) (2% (w/v)) solution. The solution was placed on the grid for 30 s to allow deposition of polymeric micelle onto the collodion membrane. The excess solution was blotted with a piece of filter paper and the sample was air-dried for 15 min at room temperature. The grid was mounted into the TEM machine for imaging, conducted at an acceleration voltage of 120 kV. The nanomicelle core diameter was calculated from 369 individual nanomicelles using Image J 1.48 v software (National Institute of Health, USA).

Fluorescence Correlation Spectroscopy (FCS)

Diffusion times were calculated from the autocorrelation functions of free DBCO-avidin proteins and avidin-NM (measured in separate samples, both in D-PBS, at 100 nM avidin concentration) through FCS employing an LSM880 microscope equipped with a C-Apochromat 40× (water immersion) objective (Carl Zeiss, Germany). Autocorrelation functions were obtained from either the fluorescence signals of FITC or Cy5 separately. In-built software was employed to convert autocorrelation functions to diffusion times. The number of avidin proteins per nanomicelle was calculated by dividing the FITC fluorescence counts per molecule (CPM) of avidin-NM by the CPM of free avidin-DBCO.

Analytical Ultracentrifugation (AUC)

AUC was performed using an analytical ultracentrifuge (Optima XL-1, Beckman Coulter, USA) equipped with an AnTi60 rotor cell that was able to house 3 sets of 1.2 mm two-channel Epon-filled centerpiece. The measurement was carried out by setting the detection of absorbance at 650 nm and the rotation speed to 18,000 rpm (26,081 G), at 20° C. Radial absorbance data were collected in continuous scanning mode at 0.002 cm increments and 3 min intervals for a total of 120 scans. Acquired sedimentation boundaries were fitted based on the Lamm equation using the continuous sedimentation coefficient model in the SEDFIT software to calculate the distribution of sedimentation coefficient (in Svedberg units) with the following parameters: resolution 100 S, $S_{min}$ 0 S, $S_{max}$ 150 S, friction 1.2μ, buffer density 1.02 g/cm$^3$, viscosity 0.01002 poise, and partial specific volume 0.73 cm$^3$/g. Sedimentation coefficient was converted to molecular weight (M) by the Svedberg Equation:

$$M = RTs/((1-v\rho)D)$$

where s=sedimentation coefficient, R=gas constant, T=absolute temperature, v=partial specific volume, ρ=solution density, and D=diffusion coefficient (calculated using the Einstein-Stokes equation with the DLS diameter).

Primary Brain Endothelial Cell Isolation and Culturing

Primary brain endothelial cells were isolated as previously described (Gonzalez-Carter et al., 2019). Rats (Sprague-Dawley, female, 8 weeks old) were sacrificed and the brain cortex isolated over dissection buffer (HBSS/1% BSA/2% Pen/Strep, 4° C.). Following removal of the meninges and visible blood vessels, the cortex was homogenized and incubated in digestion buffer (DMEM/Ham's F12 with collagenase, dispase, DNase type I and trypsin) at 37° C. The digest was centrifuged in separation gradient buffer (25% BSA in HBSS) and the microvessel pellet further incubated in digestion buffer (1 hr, 37° C.). The microvessel fragments were collected by centrifugation and plated on Cell-BIND T75 cell culture flasks (Corning, USA) coated with calf skin collagen type-I and bovine plasma fibronectin in endothelial cell growth medium MV2 (PromoCell, Germany) supplemented with vascular endothelial growth factor (VEGF, 0.5 ng/mL) (unless otherwise stated), IGF-1 (20 ng/ml), EGF (5 ng/mL), bFGF (10 ng/ml), hydrocortisone (200 ng/mL), ascorbic acid (1000 ng/ml), 5% (v/v) fetal calf serum and 5% Pen/Strep (hereafter termed full MV2 medium) with 4 μg/mL puromycin and 100 μg/mL endothelial cell growth supplement. After 5 days culturing (37° C., 5% CO$_2$), the culture medium was changed to low puromycin (1 μg/mL) until reaching confluency. For experimentation, cells were detached with trypsin/EDTA solution and plated in appropriate cell culture plates (coated with collagen/fibronectin) in full MV2 medium. Once cells reached 90% confluency (after c. 4 days), the medium was changed to full MV2 medium with no VEGF (here after termed NV-MV2) for 3 days to allow full adoption of a BBB phenotype before experimentation began.

Peripheral Endothelial Cell Culturing

Human umbilical vein endothelial cells (HUVEC), employed as an in vitro model of peripheral vasculature endothelial cells (Azcutia et al, 2010; Altannavch et al, 2004; Wautier et al, 1994) were obtained from the JCRB cell bank and employed between passages 2 and 7. HUVEC culturing, collection and plating conditions were identical to primary brain endothelial cells (see above) with the exception of culturing in NV-MV2 medium.

In Vitro Nanomicelle Uptake into Biotinylated Endothelial Cells

Endothelial cell surfaces were labelled with biotin by employing the cell-impermeable biotinylating agent sulfo-NHS-LC-biotin (EZ-Link, ThermoScientific, US), capable of binding to primary amines of cell surface proteins through its N-hydroxysuccinimide moiety. Cells were washed with ice-cold HBSS and incubated with sulfo-NHS-LC-biotin (500 μg/mL in HBSS, 20 mins, 4° C.). Cells were then washed with ice-cold HBSS and either directly treated with nanomicelles (either blank nanomicelles or avidin-NM at 200 μg/mL in culturing medium) (at 37° C. or 4° C. for specified time-points) or incubated (37° C.) in culturing medium for specified timepoints before nanomicelle treatment (as above). Cells were then thoroughly washed with culturing medium, stained with Hoechst dye (in culturing medium) and fixed (4% paraformaldehyde). Nanomicelle uptake was assessed by quantifying Cy5 fluorescence in an Infinite M1000 Pro fluorescence microplate reader (Tecan, Switzerland) and by visualizing nanomicelle localization through confocal laser scanning microscopy imaging of Cy5 or FITC fluorescence signal (LSM880 Carl Zeiss microscope). In experiments employing biotinylated-PECAM-1 antibody to biotin-label the endothelial cell surface, the same above protocol was applied, except cells were incubated with biotinylated α-PECAM-1 (in culturing medium) at 37° C. for 1 hr, followed by incubation with avidin-NM (200 μg/mL in culturing medium) for 90 mins after appropriate washes (all HBSS washes were done with room temperature HBSS).

In Vivo Confocal Laser Scanning Microscopy

Mice were anaesthetized with 2.5% isolfuorane and directly placed on a thermoplate (Tokai Hit, Japan). The ear was placed flat against a viewing glass cover slip and a canulae inserted into the tail vein. An AIR confocal laser-scanning microscopy system attached to an upright ECLIPSE FN1 microscope (Nikon, Japan) was employed for image capture. Ear vasculature imaging region was set using autofluorescence (488 laser excitation) of the tissue. Intravascular antibody (eFluor450 conjugated) circulation was imaged with a 405 laser excitation. Fluorescence signal was detected within a c. 10 μm thick plane (pin-hole size=109.8 μm; magnification=×20) at 10 second (first 5 mins) or 1 min (subsequent captures) intervals. Antibody injection (25 μg) was administered through the tail-vein canulae during the first 10 second interval following the first image capture.

In Vivo Nanomicelle Uptake Following Endothelial Labelling

Balb-c mice (female, 5 weeks old) were systemically (tail-vein) injected with D-PBS or biotinylated anti-PECAM-1 (biotin-α-PECAM1) (monoclonal rat anti-mouse, 25 μg, ThermoFisher). Following appropriate time-intervals, the mice were systemically (tail-vein) injected with avidin-NM (200 μg in D-PBS). After 16 hr, the mice were anaesthetized (isofluorane) and perfused with D-PBS (trans-hepatic perfusion followed by trans-cardial perfusion) before organ collection into D-PBS and weighing. Organs were then homogenized in a multi-bead shocker homogenizer (Yasui Kikai, Japan) in passive lysis buffer (Promega), followed by nanomicelle fluorescence quantification in the homogenates with an Infinite M1000 Pro fluorescence microplate reader (Tecan, Switzerland). A subset of brains from selected groups was dissected into two hemispheres before homogenization in order to process one hemisphere for immunohistochemistry. The non-homogenized hemisphere was submerged in 4% PFa (4° C., 24 hr) followed by cryoprotection in 20% sucrose (4° C., 24 hr). The hemisphere was then cryosectioned into 20 µm slices and mounted onto glass slides for immunostaining.

Biotin-α-PECAM-1 Antibody Ligand Conjugation onto Avidin-Nanomicelles

To examine the biodistribution of avidin-NM pre-conjugated with biotin-α-PECAM1, avidin-NM (200 µL, 1 mg/mL) were incubated with biotin-α-PECAM1 (50 µL, 500 µg/mL) at 4° C. for 72 hrs. Mice were then injected with the total 250 µL mixture solution to maintain nanomicelle and antibody ligand concentrations equal to those in endothelial labelling experiments (see above). The mice were perfused 16 hr following nanomicelle injection and nanomicelle accumulation in organs quantified as before.

Ex Vivo Whole Brain Fluorescence Imaging

Whole brains were excised following perfusion as described above. The brains were placed inside an In Vivo Imaging System (IVIS, Perkin Elmer) and single Cy5 fluorescence images captured for all comparison brains.

Immunohistochemistry

Tissue slices were blocked with 100% Blocking One solution (Nacalai Tesque, Japan) prior to staining with α-PECAM1 (rat anti-mouse, SantaCruz, US) (700 ng/ml diluted in PBS/0.1% Tween) (16 hr, 4° C.). Following washing with PBS/0.1% Tween, tissue was stained with Alexa-555 goat anti-rat (1:300 dilution, 2 hrs, room temperature). Cell nuclei were visualized by saturating the tissue with Prolong Gold DAPI mounting medium (Invitrogen, US) before covering with a glass coverslip for confocal microscopy visualization (LSM880 Carl Zeiss microscope).

Minimal staining was seen when the primary antibody was omitted (supplementary FIG. 8), indicating Alexa 555 goat anti-rat secondary antibody recognized the α-PECAM1 antibody employed for immunostaining and not the biotinylated α-PECAM1 antibody previously administered as a targeting ligand.

Statistics

Statistical analysis was carried out through linear and non-linear (one-phase decay) regression analysis, one-way ANOVA (with Tukey's post-hoc tests) and t-tests (unpaired, two-way) for indicated experiments with the use of GraphPad Prism software.

Results

Nanomicelle Synthesis, Decoration and Characterization

In order to create nanoparticles capable of recognizing biotin-labelled endothelial cells, avidin-decorayted nanomicelles (avidin-NM) were synthesized by reacting $N_3$-decorated PEGylated polyion-complexed nanomicelles with DBCO-avidin (FIG. 1a). The resulting avidin-NM had a hydrodynamic diameter (Z-average) of 44.6±4.3 nm with a monodispersed size distribution, as determined by single-peak DLS histogram distributions (as % volume) and a PDI value of 0.149±0.02 (FIG. 1b, table 1). The spherical morphology of the nanomicelles was further confirmed through TEM, demonstrating well dispersed individual nanomicelles with a core diameter (calculated as number average) of 22.4±0.3 nm (FIG. 1c, table 1). Z-potential measurements indicated the avidin-nanomicelles had a near neutral surface charge (table 1).

TABLE 1

Characterization of avidin-nanomicelle size, distribution (n = 6 independent syntheses) and Z-potential (n = 2) through DLS, and core size quantification through TEM (quantified from 369 individual nanomicelles)

| Sample | Hydrodynamic size (Z-average) (nm) | PDI | Z-potential (mV) | Core size (nm) |
|---|---|---|---|---|
| Avidin-nanomicelles | 44.6 ± 4.3 | 0.149 ± 0.02 | 0.11± 0.91 | 22.4 ± 0.27 |

Appropriate decoration of avidin proteins onto the nanomicelle surface was confirmed by tracking the movement of individual avidin proteins (FITC-tagged) through fluorescence correlation spectroscopy (FCS). Reaction of avidin-DBCO with $N_3$-nanomicelles resulted in a marked right-shift in the autocorrelation curve of avidin (FIG. 1d, blue plot) compared to free avidin proteins (FIG. 1d, red plot), which translated to an increase in diffusion time from 228±25 µs to 1577±78 µs (table 2). Furthermore, the autocorrelation curve of avidin-NM obtained through FITC detection (i.e. detecting avidin movement) closely followed the autocorrelation curve obtained through detection of Cy5 (i.e. detecting nanomicelle movement) (FIG. 1d, magenta plot), demonstrating proper decoration of avidin proteins onto the nanomicelles. FCS was further employed to calculate the decoration number of avidin proteins per nanomicelle by dividing the FITC fluorescence counts per molecule (CPM) obtained from avidin-NM by the CPM of free avidin proteins, yielding a decoration number of 3.8±0.7 avidin proteins per nanomicelle (table 2).

TABLE 2

Quantification of avidin functionalization by fluorescence correlation spectroscopy (n = 6 independent syntheses)

| Sample | Diffusion time (µs) | Counts per molecule | Avidin per nanomicelle |
|---|---|---|---|
| Free avidin | 228 ± 24.9 | 4.7 ± 0.3 | — |
| Avidin-nanomicelles | 1577 ± 77.9 | 17.8 ± 3.8 | 3.8 ± 0.7 |

Avidin decoration number was further confirmed through analytical ultracentrifugation, which demonstrated an increase of 1.5 Svedberg units in the sedimentation coefficient between blank and avidin-decorated nanomicelles (FIG. 2e), translating to a molecular weight difference of 191 kDa (table 3).

TABLE 3

Quantification of avidin functionalization by analytical ultracentrifugation (single nanomicelle synthesis)

| Sample | Sedimentation coefficient | Molecular weight (kDa) | Mw difference (kDa) | Avidin per nanomicelle |
|---|---|---|---|---|
| Blank-nanomicelles | 27.2727 | 1950 | — | — |
| Avidin-nanomicelles | 28.7879 | 2141 | 191 | 3.2 |

Taking the molecular weight of individual (deglycosylated) avidin proteins as 60 kDa, AUC indicated a decoration number of 3.2 avidins per nanomicelle, closely matching the estimation obtained through FCS.

Selective Avidin-NM Internalization into Brain Endothelial Cells Through Cell-Surface Biotin Labelling Following confirmation of avidin decoration onto $N_3$-decorated nanomicelles, the ability of avidin-NM to be internalized into biotin-labelled brain endothelial cells (EC) was examined in vitro. To this end, the cell surface of primary brain EC was biotinylated through conjugation of sulfo-NHS-LC-biotin to cell membrane proteins. Such cell-surface biotin labelling resulted in a significant increase in avidin-NM internalization compared to blank (i.e. non-decorated) nanomicelles (blank-NM), as demonstrated by a marked time-dependent increase in cell-associated Cy5 fluorescence over a 4 hr period (FIG. 2a). Avidin-NM internalization was specifically mediated by the avidin-biotin interaction, as no increase in avidin-NM internalization was seen in EC lacking biotin labelling (FIG. 2b). Furthermore, the avidin-NM uptake was significantly inhibited by incubation at 4° C. (FIG. 2b), demonstrating the requirement of an energy-dependent endocytic process for avidin-NM internalization.

The active internalization of avidin-NM was further confirmed through confocal laser scanning microscopy of EC following 4 hr nanomicelle treatment. Both biotin-labelled EC treated with blank-NM (FIG. 2c) and unlabelled EC treated with avidin-NM (FIG. 2d) had negligible Cy5 fluorescence compared to biotin-labelled EC treated with avidin-NM (FIG. 2e). Furthermore, Cy5 fluorescence (i.e. nanomicelle signal) of biotin-labelled, avidin-NM treated cells strongly colocalized with FITC fluorescence (i.e. avidin signal) within the cells (FIG. 2f, g; expanded image in supplementary FIG. 1a-c), indicating the protein-nanomicelle complex entered the cells as a unit. Importantly, while there was still Cy5 fluorescence in biotin-labelled EC treated with avidin-NM at 4° C., fluorescence was limited to the endothelial cell wall with no localization in the cytosol (FIG. 2h; expanded image, colocalization with FITC signal, and cell body visualization through Cell Mask staining and phase-contrast microscopy in supplementary FIG. 1d-h), demonstrating avidin-NM are able to bind to the cell surface biotin label but are not internalized under energy-depleting conditions. Similarly to brain EC, cell-surface biotin labelling of peripheral EC induced a significant increase in avidin-NM internalization in an energy-dependent manner (supplementary FIG. 2).

Following confirmation of efficient avidin-NM internalization into both brain and peripheral EC mediated by biotin labelling, the ability of the lower endocytic rate of brain EC to promote retention of the biotin label on the cell surface of brain EC compared to peripheral EC as a function of time was examined. To this end, the cell-surface of brain and peripheral EC were biotin-labelled as before and the cells incubated for increasing time-periods to allow for biotin-label removal (endocytosis) before treatment with avidin-NM. Quantification of Cy5 fluorescence (above non-biotin labelled EC) indicated the effect of cell-surface biotin labelling on avidin-NM uptake was lost at a significantly faster rate in peripheral EC compared to brain EC (FIG. 3a), so that at 8 hr post-biotin labelling peripheral EC had only 35.5% of the initial avidin-NM targeting (FIG. 3b). Conversely, the avidin-NM internalization response in brain EC did not decrease as a function of time (FIG. 3b). Interestingly, there was actually a small yet significant enhancement in avidin-NM uptake in brain EC compared to the initial internalization response. CLSM imaging confirmed brain EC had comparably high avidin-NM uptake at both 0 hr and 8 hr following biotin-labelling, while avidin-NM uptake into peripheral EC reverted close to non-biotin labelling levels when treated at 8 hr following biotin-labelling (FIG. 3c).

In Vivo Nanoparticle Brain Targeting Through Selective Labelling of the Brain Microvasculature Next, whether the lower endocytic rate of brain EC is able to generate brain-targeting of nanoparticles through selective labelling of the brain microvasculature was examined in vivo. To this end, microvascular endothelial cells were biotin-labelled by employing a biotinylated anti-PECAM-1 antibody (biotin-α-PECAM1) to promote uptake of avidin-NM.

Firstly, the temporal dynamics of vascular labelling by α-PECAM1 antibodies was examined. Antibodies were detected by in vivo confocal laser scanning microscopy circulating within the vascular lumen (artery) within 10 s following intravenous injection (FIG. 4a, b, yellow arrow). Antibodies began to accumulate on the arterial vascular wall within 20s (FIG. 4c, yellow arrow heads) and on the venous vascular wall within 40 s (FIG. 4e, red arrow heads). By 10 mins, the antibodies were detected lining both arterial and venous vascular walls (FIG. 4i, yellow and red arrowheads, respectively). By 1.5 hr, the vascular wall localization of the antibodies was further pronounced, with minor antibody detection within the vascular lumen (FIG. 4j), indicating the majority of the antibodies present were associated with the vascular walls (i.e. endothelial cells) and a comparably negligible number of antibodies remained circulating in the blood stream. Because of its relatively low resolution, in vivo CLSM does not allow for accurate discrimination between antibodies bound to the endothelial cell wall and antibodies internalized into the endothelial cells. Therefore, the degree of label display with respect to time was not able to be measured.

Secondly, the ability of cell-surface-bound biotin-α-PECAM1 to induce cellular internalization of avidin-NM was examined in vitro. Cell-surface labelling of brain endothelial cells with biotin-α-PECAM1 led to a dose-dependent increase in avidin-NM uptake (FIG. 5a). Furthermore, CLSM visualization revealed avidin-NM were not limited to the cell surface, but were properly internalized into brain EC (FIG. 5b), similar to internalization induced by indiscriminately biotin-labelling surface proteins (i.e. FIG. 2).

The ability of biotin-α-PECAM1 to target avidin-NM to the brain through increased retention on the brain microvasculature was then examined by intravenously injecting Balb/c mice with free, unconjugated biotin-α-PECAM1 followed by intravenous injection of avidin-NM at increasing time-periods (supplementary FIG. 3). Quantification of Cy5 fluorescence in harvested organs revealed avidin-NM injected a short time-period (15 mins) following biotin-α-PECAM1 injection had significant targeting into the lung, heart, pancreas and brain, with no targeting seen for the liver, kidney, spleen and muscle (FIG. 5c, supplementary FIG. 4). Importantly, this biodistribution pattern was also seen if avidin-NM were pre-conjugated to biotin-α-PECAM1 before injection into mice (supplementary FIG. 5), indicating the short time-period biodistribution pattern was due to differences in PECAM1 vascular expression and not due to artefactual effects associated with circulating biotin-α-PECAM1 antibodies. Furthermore, preliminary experiments demonstrated biotin-α-PECAM1 administration dose-dependently increased avidin-NM accumulation into the brain and lung (supplementary FIG. 6).

While injection of avidin-NM a short time-interval following unconjugated biotin-α-PECAM1 injection resulted in significant nanomicelle targeting into peripheral organs in addition to the brain, increasing the time-interval between injections induced a marked decrease in nanomicelle targeting to the lung (−21.7±8.0%/hr), heart (−6.7±2.3%/hr) and pancreas (−4.7±3.4%/hr), while targeting into the brain remained nearly constant (−0.2±5.5%/hr) (FIG. 5d, e). The differential targeting decrease rate between peripheral organs and the brain resulted in significant avidin-NM targeting only into the brain when nanomicelles were injected 8 hr after the initial biotin-α-PECAM1 injection (FIG. 5f). The shift in the avidin-NM targeting profile between short (15 mins) and long (8 hr) injection delay translated into a brain-to-organ targeting ratio increase of ×71.4 against the lung, ×2.6 against the heart and ×2.1 against the pancreas (table 4).

TABLE 4

Nanoparticle targeting ratio of brain to lung, heart and pancreas

| Organ comparison | Targeting ratio (15 mins) | Targeting ratio (8 hr) | Targeting ratio (fold increase) |
| --- | --- | --- | --- |
| Brain: Lung | 0.64 | 45.7 | ×71.4 |
| Brain: Heart | 1.5 | 3.9 | ×2.6 |
| Brain: Pancreas | 1.6 | 3.4 | ×2.3 |

Targeting of avidin-NM into the brain was further confirmed through ex vivo fluorescence imaging of freshly excised whole brains and immunohistochemical staining of cryosectioned fixed brain tissue. Visualization of nanomicelle fluorescence (Cy5) revealed treatment with biotinylated α-PECAM1 ligand led to a robust increase in the accumulation of avidin-NM throughout the brain (FIG. 6a). Furthermore, avidin-NM accumulation was comparable whether nanomicelles were injected 15 mins or 8 hrs following biotin-α-PECAM1 ligand injection.

CLSM imaging of fixed tissue sections revealed a similarly marked increase in avidin-NM localization in the brain tissue of biotin-α-PECAM1 treated (8 hr interval) vs. PBS treated mice (FIG. 6b-c). Nanomicelle content appeared restricted to the microvasculature, with a long microvessel-like fluorescence pattern seen throughout the tissue. Nanomicelle accumulation in the brain microvasculature was confirmed through microvessel immunostaining. Strong colocalization between the nanomicelle signal and microvessel signal was seen throughout (FIG. 6d-f). Interestingly, high magnification CLSM imaging revealed that the nanomicelle signal distribution had a discreet, punctate pattern (FIG. 6g) similar to the distribution of peptides targeting cell-junction proteins in the brain (Tang et al. 2019), indicating avidin-NM successfully targeted the biotin-labelled inter-endothelial PECAM1 proteins.

Discussion

In the present study, we show brain-targeting specificity may be generated by exploiting the reduced endocytosis of brain endothelial cells to selectively label the brain microvasculature with a ligand capable of being recognized by nanoparticles. We have established the in vivo feasibility of this approach by demonstrating that binding of a biotinylated anti-PECAM1 antibody ligand to both the peripheral and the brain microvasculature leads to increased antibody removal from peripheral endothelial cells, resulting in preferential retention of biotin-labelling on brain endothelial cells. Avidin-decorated nanomicelle targeting to the brain is consequently increased as a function of the time-interval between ligand and nanomicelle injection.

PECAM-1 was selected as a target protein as it is present in the vasculature of the majority of tissues, yet its expression is higher in the lung, heart and pancreas compared to the brain (Vanlandewijck et al, 2018; Eppihimer et al, 1998). In line with this, direct functionalization of nanoparticles with α-PECAM-1 antibodies has been shown to promote higher targeting of the nanoparticles into the lung and heart over the brain (Parhiz et al., 2018; Dan et al., 2013). In addition, PECAM-1 has been shown to be endocytically removed from the surface of peripheral endothelial cells within hours (Mamdouh et al., 2003; Goldberger et al., 1994), as well as being highly associated with caveolae-mediated endocytosis (Noel et al., 2013; Bakhshi et al., 2013; Kronstein et al., 2012). Therefore, PECAM-1 was an ideal candidate to examine whether the higher impermeability of the BBB (which is a direct consequence of reduced constitutive caveolar endocytosis) could be harnessed to achieve selective brain microvasculature labelling.

One apparent limitation of targeting a non-transporter protein such as PECAM-1 to selectively label the brain microvasculature would be its inability to induce nanoparticle transcytosis across brain endothelia to reach the brain parenchyma. However, increasing evidence indicates brain penetration of nanoparticles is not strictly reliant on the transporter function of target proteins. For instance, nanoparticles targeting the membrane channel transporters nAchR, Glut-1, SLC7A5 or ChT (You et al., 2018; Anraku et al. 2017; Li et al., 2016; Li et al., 2011; Li et al. 2013) have been shown to be transcytosed into the brain despite the fact that these target proteins, due to their size, are unable to transport nanoparticle through their 'normal' biological functions. Similarly, direct functionalization of iron oxide nanoparticles with α-PECAM1 antibodies has been shown to successfully transcytose the iron oxide nanoparticles across the BBB into the brain parenchyma (Dan et al., 2013). Instead, nanoparticle brain entry may rely on increasing nanoparticle interaction with the cell surface, as is the case for the well described brain entry mechanism of adsorptive-mediated transcytosis (Goulatis et al., 2017). Indeed, both the nanometrical curvature (Zhao et al., 2017) and the protein-clustering ability of multi-valent nanoparticles (Liu et al., 2010; Muro et al., 2003) has been shown to promote endocytic cellular internalization, which, under appropriate conditions, would promote release into the brain parenchyma. Therefore, the high retention of avidin-decorated nanomicelles in the brain microvasculature seen in the current study is more readily explained by the high affinity of avidin to biotin, resulting in the inability of the nanomicelle to dissociate from the internalized endocytic membrane. Indeed, nanoparticle avidity is well known to modulate the passage of nanoparticles into the brain parenchyma (Clark et al., 2015; Wiley et al., 2013). Therefore, future studies will optimize nanoparticle design by employing linkers with tuned affinity (e.g. aptamer-aptamer interaction) or pH-sensitive nanomicelle functionalization to promote detachment from labelled proteins within the endocytic vesicle and promote release into the brain parenchyma. Having said this, the current strategy's ability to achieve specific targeting of drug-loaded nanoparticles to brain endothelial cells, even without actual penetration into the brain parenchyma, would have significant therapeutic advantages for strategies aiming to induce neuroprotection through modulation of endothelial function (Lutton et al., 2019; Yu et al. 2015; Kuwahara et al., 2011, Deane et al., 2003) or by employing the brain microvasculature as a cellular reservoir for therapeutic proteins (Chen et al., 2009).

A more significant limitation of targeting PECAM-1 to selectively label the brain microvasculature would be its inter-endothelial localization. Such relatively limited distribution would allow for only a fraction of the cell surface to be labelled, thereby not achieving maximal nanoparticle uptake. Importantly however, the in vitro studies indicate selective brain microvasculature labelling would be achievable by targeting other proteins besides PECAM-1. Therefore, it will be interesting for future studies to identify proteins with more general cell surface distribution which have significantly different endocytic rates between the brain and peripheral endothelium, thereby allowing maximal endothelial cell surface labelling for increased nanoparticle uptake.

CONCLUSIONS

The present work demonstrates a simple, yet counterintuitive, strategy to specifically target nanoparticles to the brain through selective labelling of the brain microvasculature by exploiting the high impermeability of the blood-brain barrier. Such approach has the potential to revolutionize brain-targeting strategies by 1) moving away from directly functionalizing nanoparticles with targeting ligands, to instead adopt a two-step delivery strategy capable of specifically labelling the brain microvasculature with free targeting ligands to achieve genuine nanoparticle brain targeting over peripheral organs, and 2) shift the target-protein identification process from having a focus on proteins with overexpression at the brain microvasculature, to instead identify proteins with significantly different endocytic rates between the peripheral and brain vasculature, thereby expanding the target protein repertoire to achieve genuine brain targeting capable of increasing therapeutic delivery to the brain as well as decreasing clinically-restrictive peripheral side-effects.

REFERENCES

Abbott J, Patabendige A, Dolman D, Yusof S, Begley D (2010). Structure and function of the blood-brain barrier. Neurobiol Dis, 37 (1): 13-25

Altannavch T, Roubalova K, Kucera P, Andel M (2004). Effect of high glucose concentrations on expression of ELAM-1, VCAM-1 and ICAM-1 in HUVEC with and without cytokine activation. Physiol Res, 53 (1): 77:82.

Andreone B, Chow B, Tata A, Lacoste B, Ben-Zvi A, Bullock K, Deik A, Ginty D, Clish C, Gu C (2017). Blood-brain barrier permeability is regulated by lipid transport-dependent suppression of caveolae-mediated transcytosis. Neuron, 94 (3): 581-594.

Anraku Y, Kuwahara H, Fukusato Y, Mizoguchi A, Ishii T, Nitta K, Matsumoto Y, Toh K, Miyata K, Uchida S, Nishina K, Osada K, Itaka K, Nishiyama N, Mizusawa H, Yamasoba T, Yokota T, Kataoka K (2017). Glycaemic control boosts glucosylated nanocarrier crossing the BBB into the brain. Nat Commun, 8 (1): 1001

Azcutia V, Abu-Taha M, Romacho T, Vazquez-Bella M, Matesanz N, Luscinskas F, Rodriguez-Manas L, Sanz M, Sanchez-Ferrer C, Peiro C (2010). Inflammation determines the pro-adhesive properties of high extracellular d-glucose in human endothelial cells in vitro and rat microvessel in vivo. PLOS One, 5 (4): e10091.

Bakhshi F, Mao M, Shajahan A, Piegeler T, Chen Z, Chernaya O, Sharma T, Elliott W, Szulcek R, Bogaard H, Comhair S, Erzurum S, van Nieuw Amerongen G, Bonini M, Minshall R (2013). Nitrosation-dependent caveolin 1 phosphorylation, ubiquitination, and degradation and its association with idiopathic pulmonary arterial hypertension. Pulm Circ, 3 (4): 816-830.

Ben-Zvi A, Lacoste B, Kur E, Andreone B, Mayshar Y, Yan H, Gu C (2014). Mfsd2a is critical for the formation and function of the blood-brain barrier. Nature, 509:507-511

Brewer C, Riehm J (1967). Evidence for possible nonspecific reactions between N-ethylmaleimide and proteins. Analytical Biochem, 18 (2): 248-255.

Chen Y, Chang M, Davidson B (2009). Molecular signatures of disease brain endothelia provide new sites for CNS-directed enzyme therapy. Nat Med, 15 (10): 1215-1218.

Clark A, Davis M (2015). Increased brain uptake of targeted nanoparticles by adding an acid-cleavable linkage between transferrin and the nanoparticle core. PNAS, 112 (40): 12486-12491.

Dan M, Cochran D, Yokel R, Dziubla T (2013). Binding, transcytosis and biodistribution of anti-PECAM-1 iron oxide nanoparticles for brain-targeted delivery. PLOS One, 8 (11): e81051

Deane R, Du Yan S, Submamaryan R, LaRue B, Jovanovic S, Hogg E, Welch D, Manness L, Lin C, Yu J, Zhu H, Ghiso J, Frangione B, Stern A, Schmidt A, Armstrong D, Arnold B, Liliensiek B, Nawroth P, Hofman F, Kindy M, Stern D, Zlokovic B (2003). RAGE mediates amyloid-beta peptide transport across the blood-brain barrier and accumulation in brain. Nat Med, 9 (7): 907-913.

Eppihimer M, Russel J, Langley R, Vallien G, Anderson D, Granger N (1998). Differential expression of platelet-endothelial cell adhesion molecule-1 in murine tissues. Microcirculation, 5 (2-3): 179-188.

Farrell C, Yang J, Pardridge W (1992). Glut-1 glucose transporter is present within apical and basolateral membranes of brain epithelial interfaces and in microvascular enothelia with and without tight junctions. J Histochem Cytochem, 40 (2): 193-199.

Fraga S, Pinho M, Soares-da-Silva P (2005). Expression of LAT-1 and LAT-2 amino acid transporters in human and rat intestinal epithelial cells. Amino Acids, 29 (3): 229-233

Goldberger A, Middleton K, Oliver J, Paddock C, Yan H, DeLisser H, Albelda S, Newman P (1994). Biosynthesis and processing of the cell adhesion molecule PECAM-1 includes production of a soluble form. J Biol Chem, 269 (25): 17183-91.

Gonzalez-Carter D, Ong Z, McGilvery C, Dunlop I, Dexter D, Porter A (2019). L-DOPA functionalized, multi-branched gold nanoparticles as brain-targeted nano-vehicles. Nanomedicine, 15 (1): 1-11.

Goulatis L, Shusta E (2017). Protein engineering approaches for regulating blood-brain barrier transcytosis. Curr Opin Struct Biol, 45:100-115.

Hawkins B, Davis T (2005). The blood-brain barrier/neurovascular unit in health and disease. Pharmacol Rev, 57 (2): 173-185

Johnsen K, Burkhart A, Melander F, Kempen P, Vejlebo J, Siupka P, Nielsen M, Andresen T, Moos T (2017). Targeting transferrin receptors at the blood-brain barrier improves the uptake of immunoliposomes and subsequent cargo transport into the brain parenchyma. Sci Rep, 7 (1): 10396.

Kim J, Wessling-Resnick M (2012). The role of iron metabolism in lung inflammation and injury. J Allergy Ther, 3 (4), pii: 004

Kronstein R, Seebach J, Grossklaus S, Minten C, Engelardt B, Drab M, Liebner S, Arsenijevic Y, Taha A, Afanasieva T, Schnittler H (2012). Caveolin-1 opens endothelial cell junctions by targeting catenins. Cardiovasc Res, 93 (1): 130-140.

Kuwahara H, Nishina K, Yoshida K, Nishina T, Yamamoto M, Saito Y, Piao W, Yoshida M, Mizusawa H, Yokota T (2011). Efficient in vivo delivery of siRNA into brain capillary endothelial cells along with endogenous lipoprotein. Mol Ther, 19 (12): 2213-2221.

Lam F, Morton S, Wyckoff J, Han T, Hwang M, Maffa A, Balkanska-Sinclair E, Yaffe M, Floyd S, Hammond P (2018). Enhanced efficacy of combined temozolomide and bromodomain inhibitor therapy for gliomas using targeted nanoparticles. Nat Comm, 9:1991

Li J, Zhou L, Ye D, Huang S, Shao K, Huang R, Han L, Liu Y, Liu S, Ye L, Lou J, Jiang C (2011). Choline-derivate-modified nanoparticles for brain-targeting gene delivery. Adv Mater, 23 (39): 4561-4520.

Li J, Guo Y, Kuang Y, An S, Ma H, Jiang C (2013). Cholinie transporter-targeting and co-delivery system for glioma therapy. Biomaterials, 34 (36): 9142-9148.

Li L, Di X, Zhang S, Kan Q, Liu H, Lu T, Wang Y, Fu Q, Sun J, He Z (2016). Large amino acid transporter 1 mediated glutamate modified docetaxel-loaded liposomes for glioma targeting. Colloid Surf B, 141:260-267.

Lin S, Racz J, Tai M, Brooks K, Rzeczycki P, Heath L, Newstead M, Standiford T, Rosania G, Stringer K (2016). A role for low density lipoprotein receptor-related protein 1 in the cellular uptake of tissue plasminogen activator in the lungs. Pharm Res, 33 (1): 72-82.

Liu A, Aguet F, Danuser G, Schmid S (2010). Local clustering of transferrin receptors promotes clathrin-coated pit initiation. J Cell Biol, 1919 (7): 1381-1393.

Lutton E, Farney S, Andrews A, Shuvaev V, Chuang G, Muzykantov V, Ramirez S (2019). Endothelial targeted strategies to combat oxidative stress: improving outcomes in traumatic brain injury. Front Neurol, 6 (10): 582.

Mamdouh Z, Chen X, Pierini L, Maxfield F, Muller W (2003). Targeted recycling of PECAM from endothelial surface-connected compartments during diapedesis. Nature, 421 (6924): 748-753

Muro S, Wiewrodt R, Thomas A, Koniaris L, Albelda S, Muzykantov V, Koval M (2003). A novel endocytic pathway induced by clustering endothelial ICAM-1 or PECAM-1. J Cell Science, 116:1599-1609.

Noel J, Wang H, Hong N, Tao J, Yu K, Sorokina E, DeBolt K, Heayn M, Rizzo V, Delisser H, Fisher A, Chatterjee S (2013). PECAM-1 and caveolae form the mechanosensing complex necessary for NOX2 activation and angiogenic signalling with stopped flow in pulmonary endothelium. Am J Physiol Lung Cell Mol Physiol, 305 (11): L805-L818.

Nutt J, Burchiel K, Comella C, Jankovic J, Lang A, Laws E, Lozano A, Penn R, Simpson R, Stacy M, Wooten G (2003). Randomized, double-blind trial of lgial cell line-derived neurotrophic factor (GDNF) in PD. Neurology, 60 (1): 69-73.

Palmer A (2011). The role of the blood-brain barrier in neurodegenerative disorders and their treatment. J Alzheimers Dis, 24 (4): 643-656

Parhiz H, Shuvaev V, Pardi N, Khoshnejad M, Kiseleva R, Brenner J, Uhler T, Tuyishime S, Mui B, Tam Y, Madden T, Hope M, Weissman D, Muzykantov V (2018). PECAM-1 directed re-targeting of exogenous mRNA providing two orders of magnitude enhancement of vascular delivery and expression in lungs independent of apoplipoprotein E-mediated uptake. J Control Release, 291:105-115

Sevigny J, Chiao P, Bussiere T, Weinreb P, Williams L, Maier M, Dunstan R, Salloway S, Chen T, Ling Y, et al. (2016). The antibody aducanumab reduces A-beta plaques in Alzheimer's disease. Nature, 537 (7618), 50-56.

Tang F, Staquicini F, Teixeira A, Michaloski J, Namiyama G, Taniwaki N, Setubal J, da Silva A, Sidman R, Pasqualini R, Arap W, Giordano R (2019). A ligand motif enables differential vascular targeting of endothelial junctions between brain and retina. PNAS, 116 (6): 2300-2305

Tian X, Nyberg S, Sharp P, Madsen J, Daneshpour N, Armes S, Berwick J, Azzouz M, Shaw P, Abbott N, Battaglia G (2015). LRP-1-mediated intracellular antibody delivery to the central nervous system. Sci Rep, 5:11990

Vanlandewijck M, He L, Mae M, Andrae J, Ando K, Del Gaudio F, Nahar K, Lebouvier T, Lavina B, Gouveia L, Sun Y, Raschperger E, Rasanen M, Zarb Y, Mochizuki N, Keller A, Lendahl U, Betsholts C (2018). A molecular atlas of cell types and zonation in the brain vasculature. Nature, 554, 475-480.

Wautier J, Wautier M, Schmidt A, Anderson G, Hori O, Zoukourian C, Capron L, Chappey O, Yan S, Brett J (1994). Advanced glycation end products (AGEs) on the surface of diabetic erythrocytes bind to the vessel wall via a specific receptor inducing oxidant stress in the vasculature: a link between surface-associated AGEs and diabetic complications. PNAS, 91 (16): 7742-7746.

Wiley D, Webster P, Gale A, Davis M (2013). Transcytosis and brain uptake of transferrin-containing nanoparticles by tuning avidity to transferrin receptor. PNAS, 110 (21): 8662-8667.

You L, Wang J, Liu T, Zhang Y, Han X, Wang T, Guo S, Dong T, Xu J, Anderson G, Liu Q, Chang Y, Lou X, Nie G (2018). Targeted brain delivery of rabies virus glycoprotein 29-modified deferoxamine-loaded nanoparticles reverses functional deficits in Parkinsonian mice. ACS Nano, 12 (5): 4123-4139.

Yu Q, Tao H, Wang X, Li M (2015). Targeting brain microvascular endothelial cells: a therapeutic approach to neuroprotection against stroke. Neural Regen Res, 10 (11): 1882-1891.

Zhao W, Hanson L, Lou H, Akamatsu M, Chowdary P, Santoro F, Marks J, Grassart A, Drubin D, Cui Y, Cui B (2017). Nanoscale manipulation of membrane curvature for probing endocytosis in live cells. Nat Nanotechnol, 12 (8): 750-756.

The invention claimed is:

1. A method of administering a nanoparticle to a subject, comprising:
 administering to the subject an effective amount of an antibody that binds to an antigen expressed on a surface of a brain endothelial cell such that a sufficient amount of the antibody can bind to the surface of the brain endothelial cell, wherein the antibody is conjugated to a $1^{st}$ molecule; and
 administering to the subject a nanoparticle that is coated with a $2^{nd}$ molecule that binds to the $1^{st}$ molecule under a physiological condition in a brain blood vessel such that the nanoparticle can bind to the $1^{st}$ molecule that has attached to the surface of the brain endothelial cell, wherein the nanoparticle is administered after a completion of the administration of the antibody.

2. The method according to claim 1, wherein the nanoparticle is administered 1 hour or more after the administration of the antibody.

3. The method according to claim 1, wherein the antigen is a membrane-bound protein.

4. The method according to claim 3, wherein the membrane-bound protein is an endothelial cell surface marker protein.

5. The method according to claim 3, wherein the membrane-bound protein is PECAM-1.

6. The method according to claim 1, wherein the $1^{st}$ molecule is biotin and $2^{nd}$ molecule is avidin.

7. A combination kit comprising:
- an antibody that binds to an antigen expressed on a surface of a brain endothelial cell, wherein the antibody is conjugated to a $1^{st}$ molecule; and
- a nanoparticle that is coated with a $2^{nd}$ molecule that binds to the $1^{st}$ molecule under a physiological condition in a brain blood vessel,
- wherein the nanoparticle can bind to the antibody that has attached to the surface of the brain endothelial cell through an interaction between the $1^{st}$ molecule and the $2^{nd}$ molecule.

8. A pharmaceutical composition, which is to be administered to a subject who has been administered with an antibody that binds to an antigen expressed on a surface of a brain endothelial cell, wherein the antibody is conjugated to a $1^{st}$ molecule and the antibody is bound to the surface of the brain endothelial cell in the subject, comprising:
- a nanoparticle that is coated with a $2^{nd}$ molecule that binds to the $1^{st}$ molecule under a physiological condition in a brain blood vessel, wherein the nanoparticle can bind to the antibody that has attached to the surface of the brain endothelial cell through an interaction between the $1^{st}$ molecule and the $2^{nd}$ molecule.

9. A pharmaceutical composition, comprising an antibody that binds to an antigen expressed on a surface of a brain endothelial cell, wherein the antibody is conjugated to a $1^{st}$ molecule, wherein the pharmaceutical composition is to be administered before administering to a subject a nanoparticle that is coated with a $2^{nd}$ molecule that binds to the $1^{st}$ molecule under a physiological condition in a brain blood vessel, wherein the nanoparticle can bind to the antibody that has attached to the surface of the brain endothelial cell through an interaction between the $1^{st}$ molecule and the $2^{nd}$ molecule.

* * * * *